United States Patent [19]
Redfield

[11] Patent Number: 4,531,122
[45] Date of Patent: Jul. 23, 1985

[54] FLATSCREEN

[76] Inventor: Lawrence J. Redfield, 9401 Forest View Rd., Evanston, Ill. 60203

[21] Appl. No.: 398,258

[22] Filed: Jul. 14, 1982

[51] Int. Cl.³ .............................................. G09G 1/00
[52] U.S. Cl. .................... 340/781; 340/720; 313/400; 313/422
[58] Field of Search ............... 340/770, 768, 792, 781, 340/771, 773, 720; 313/373, 379, 383, 97, 400, 422; 315/366

[56] References Cited

U.S. PATENT DOCUMENTS

| | | |
|---|---|---|
| 3,078,373 | 2/1963 | Wittenberg . |
| 3,825,922 | 7/1974 | Ralph .................................... 340/781 |
| 3,875,442 | 4/1975 | Wasa et al. ........................... 340/781 |
| 4,001,620 | 1/1977 | Endriz .................................. 313/400 |
| 4,020,376 | 4/1977 | Bosserman et al. ................. 313/400 |
| 4,029,984 | 6/1977 | Endriz .................................... 313/96 |
| 4,034,255 | 7/1977 | Catanese et al. ..................... 313/400 |
| 4,142,123 | 2/1979 | Endriz .................................. 313/400 |
| 4,158,157 | 6/1979 | Schwartz ............................. 313/422 |
| 4,164,681 | 8/1979 | Catanese .............................. 313/400 |
| 4,266,159 | 5/1981 | Sickanowicz ........................ 313/422 |

Primary Examiner—Gerald L. Brigance

[57] ABSTRACT

A flat, bi-planar display panel consisting primarily of a cathodoluminescent light emitting screen comparable to existing cathode ray tubes, and an array of photocathodes to produce electrons for the phosphor screen and to address picture elements. The scanning system consists of integral opto-electronic shift registers, with photocathodes and luminescent anodes as active elements, picture elements addressed by electrical and optical signals from these registers.

7 Claims, 20 Drawing Figures

3b

3c

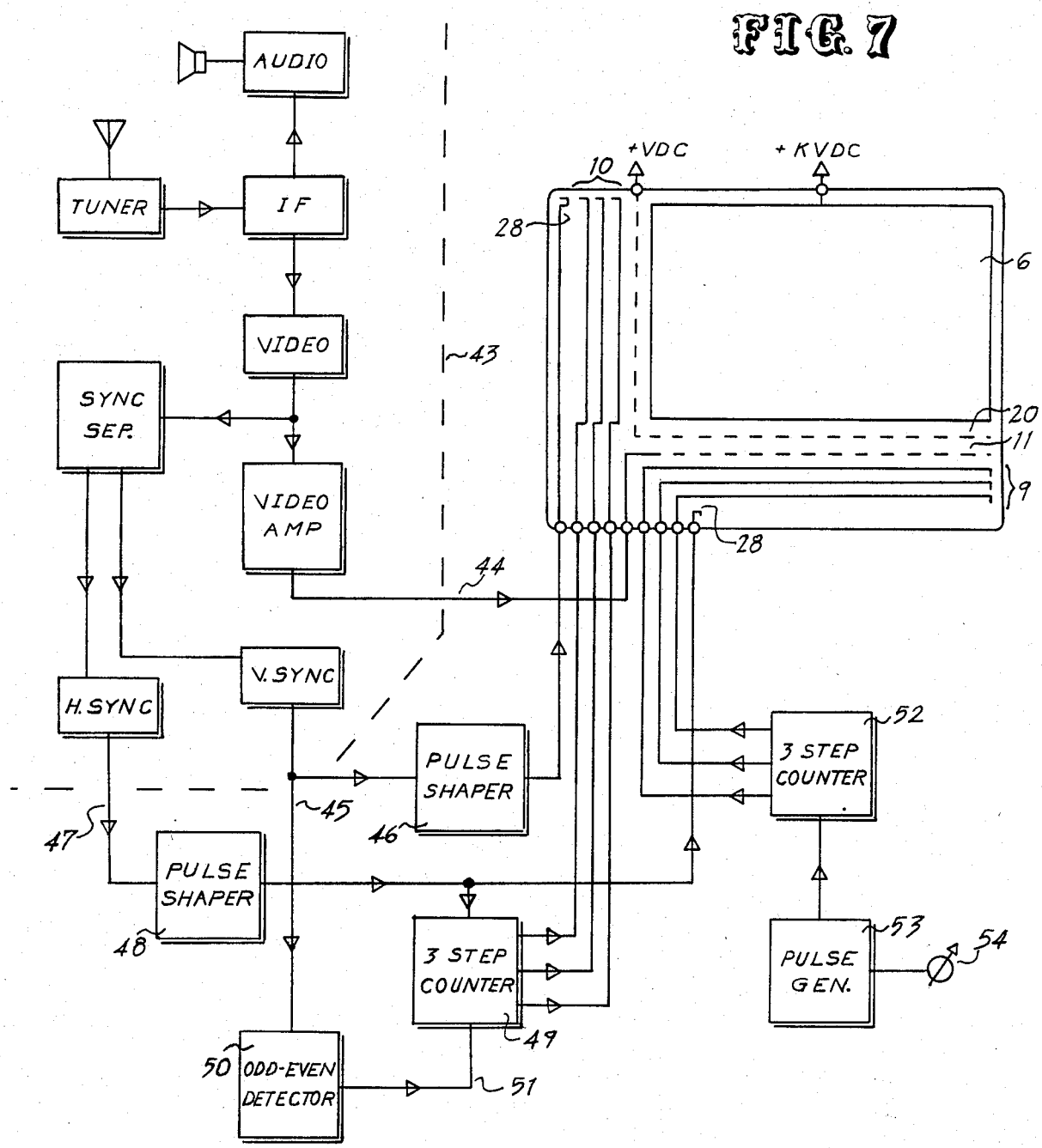
FIG. 7
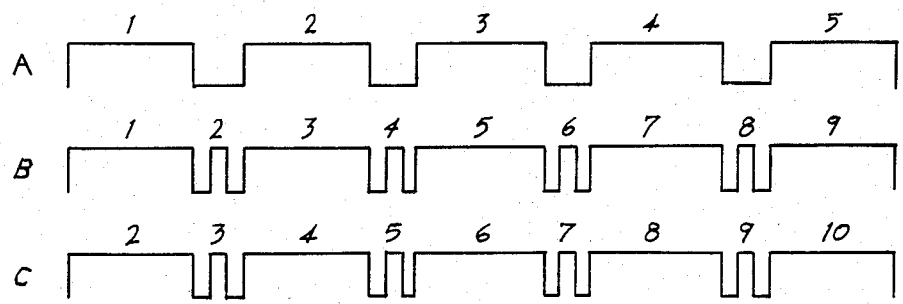
7a

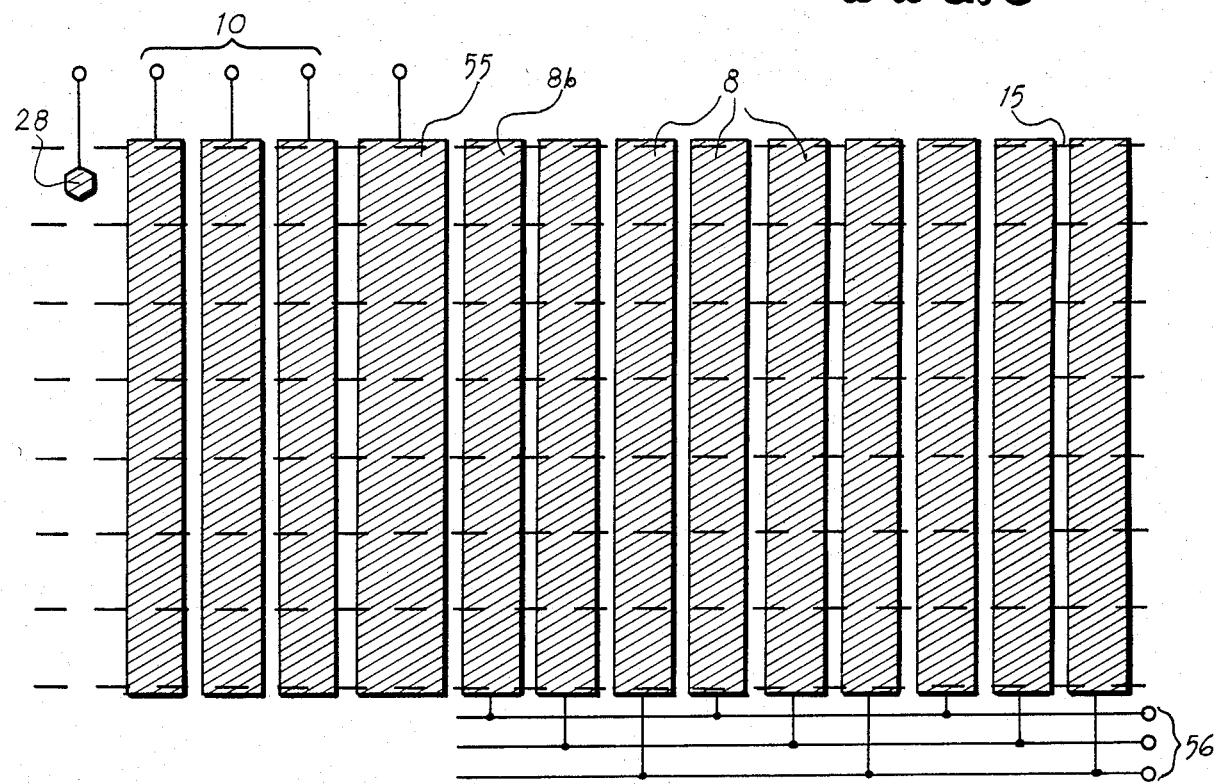
FIG. 8
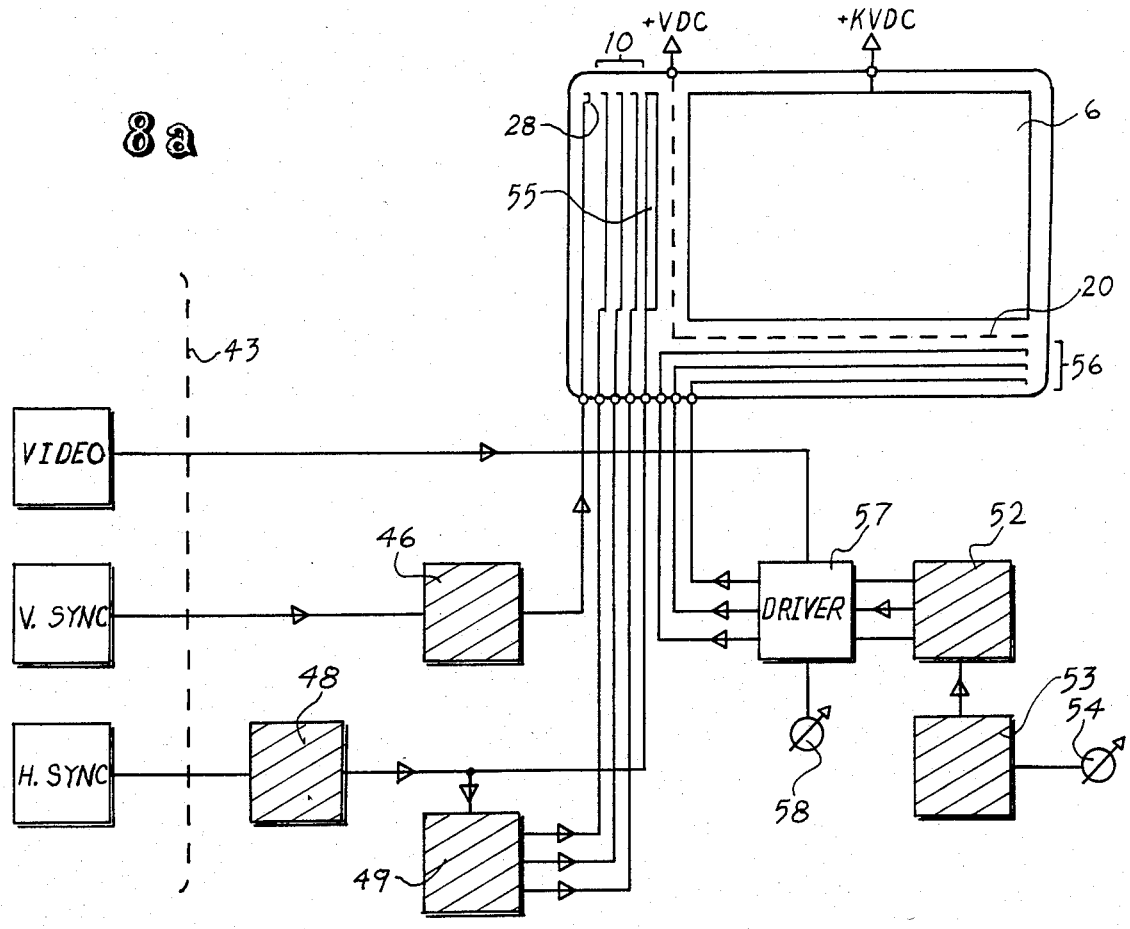
8a

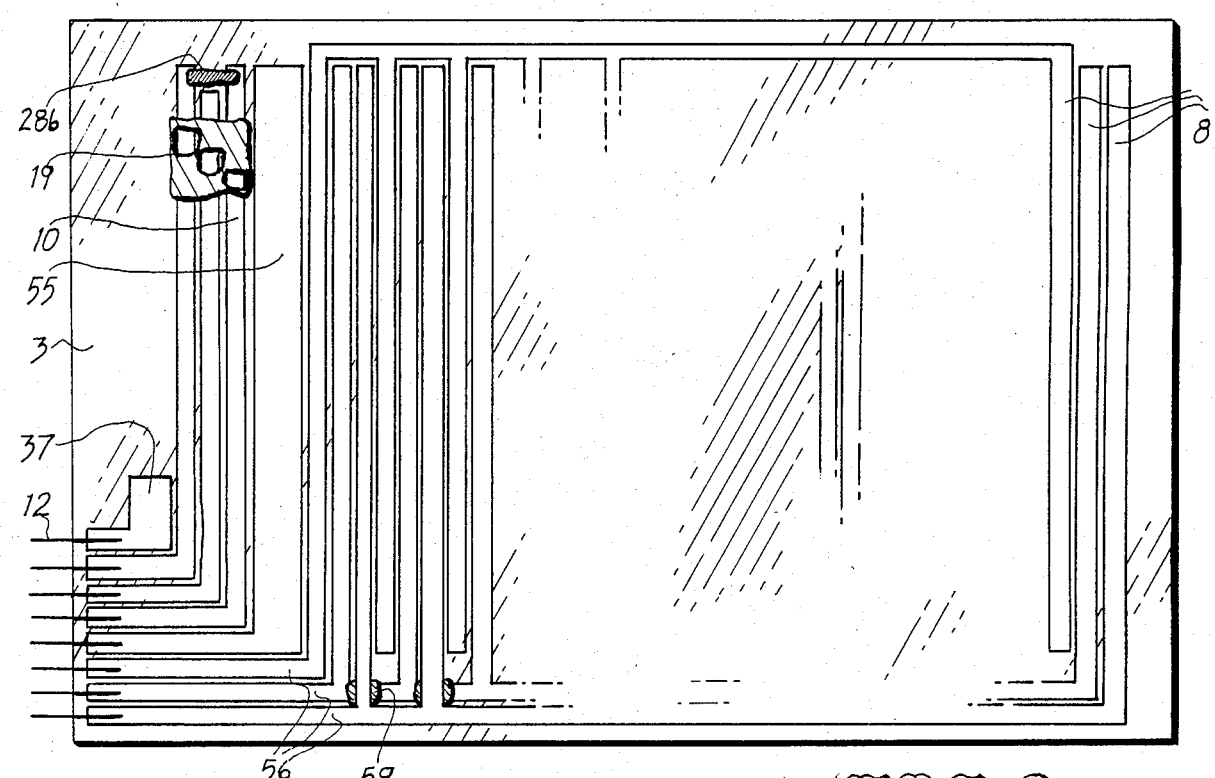
FIG. 9
FIG. 10
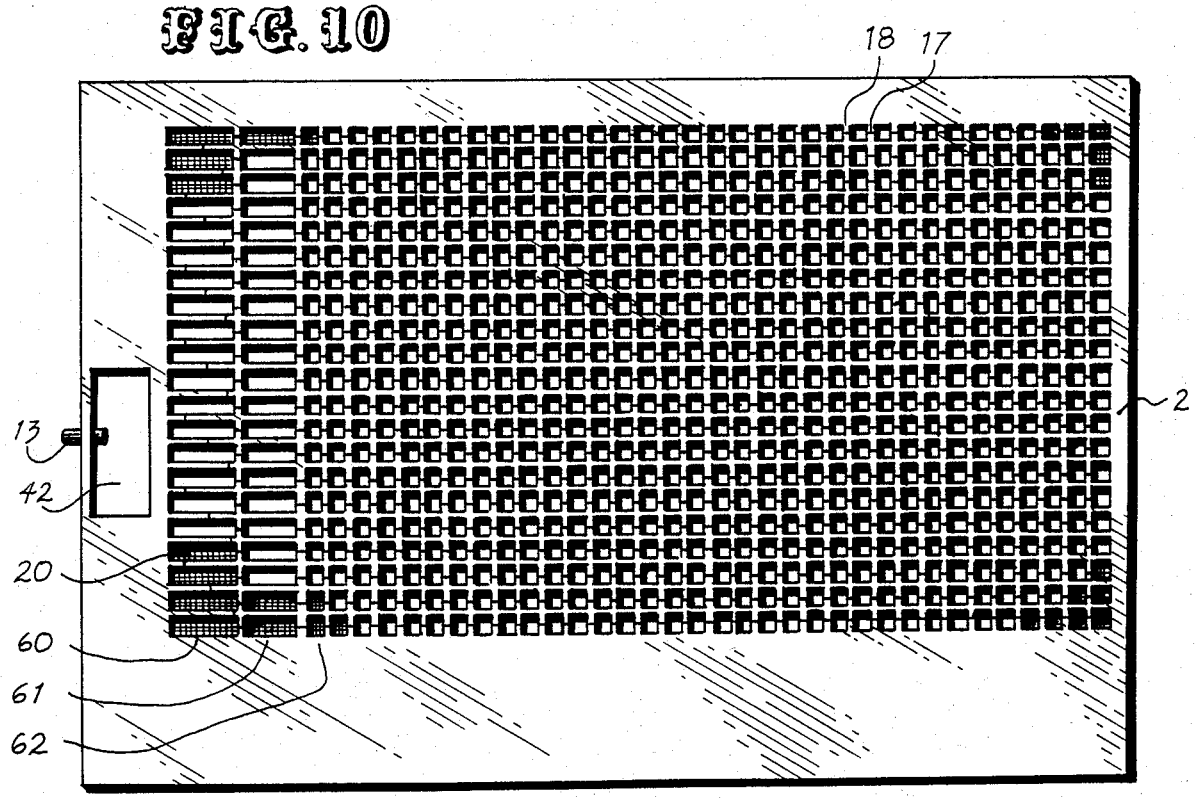

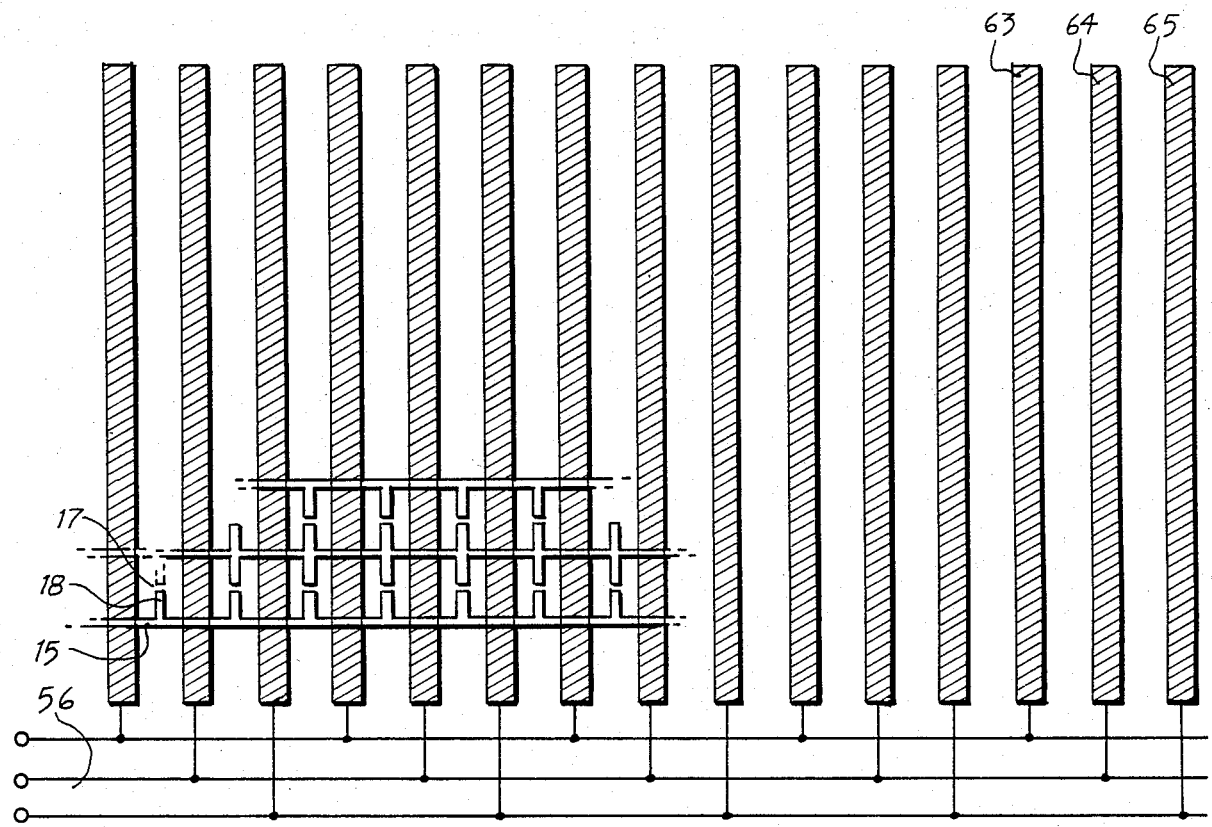
FIG.11
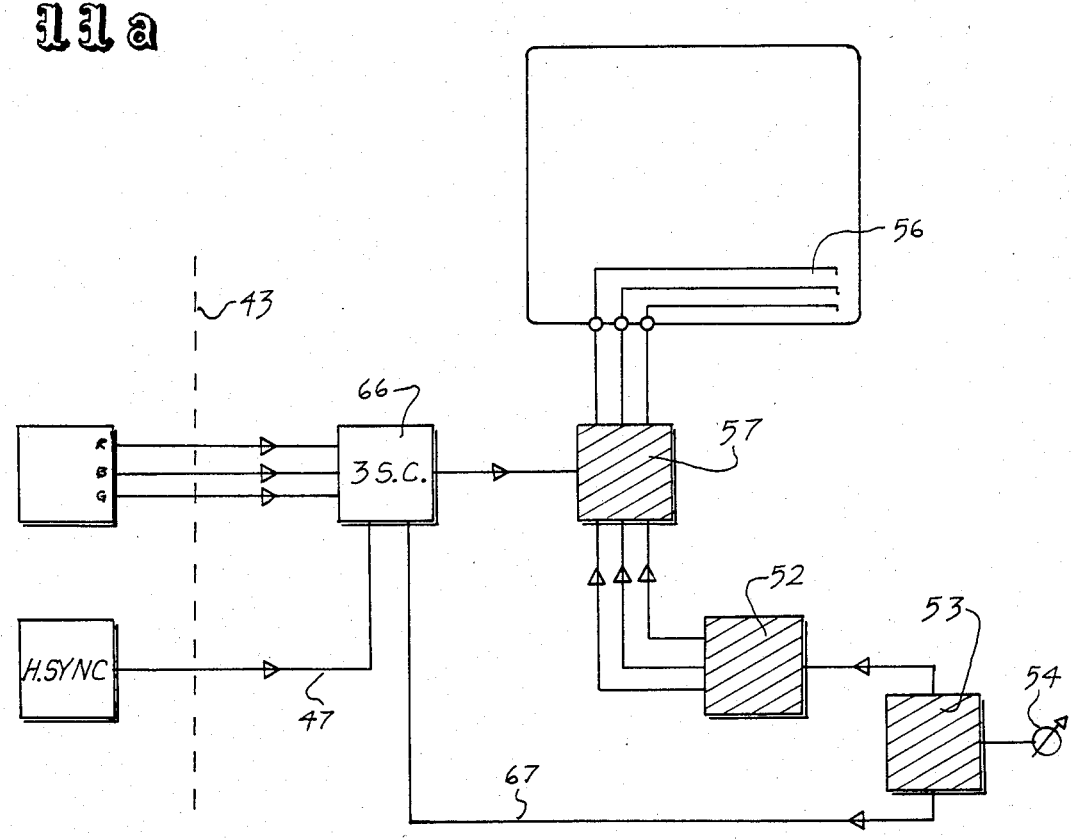
11a

12a

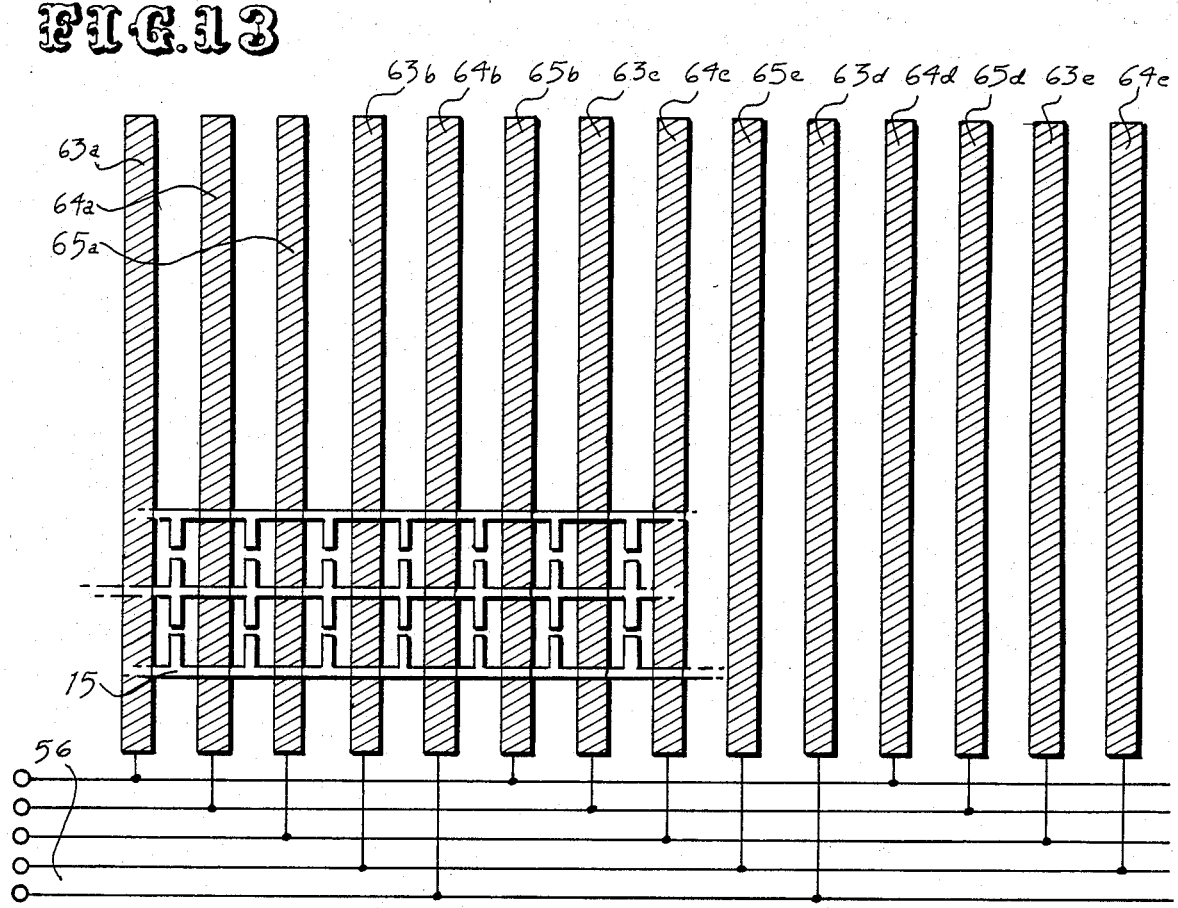
FIG. 13
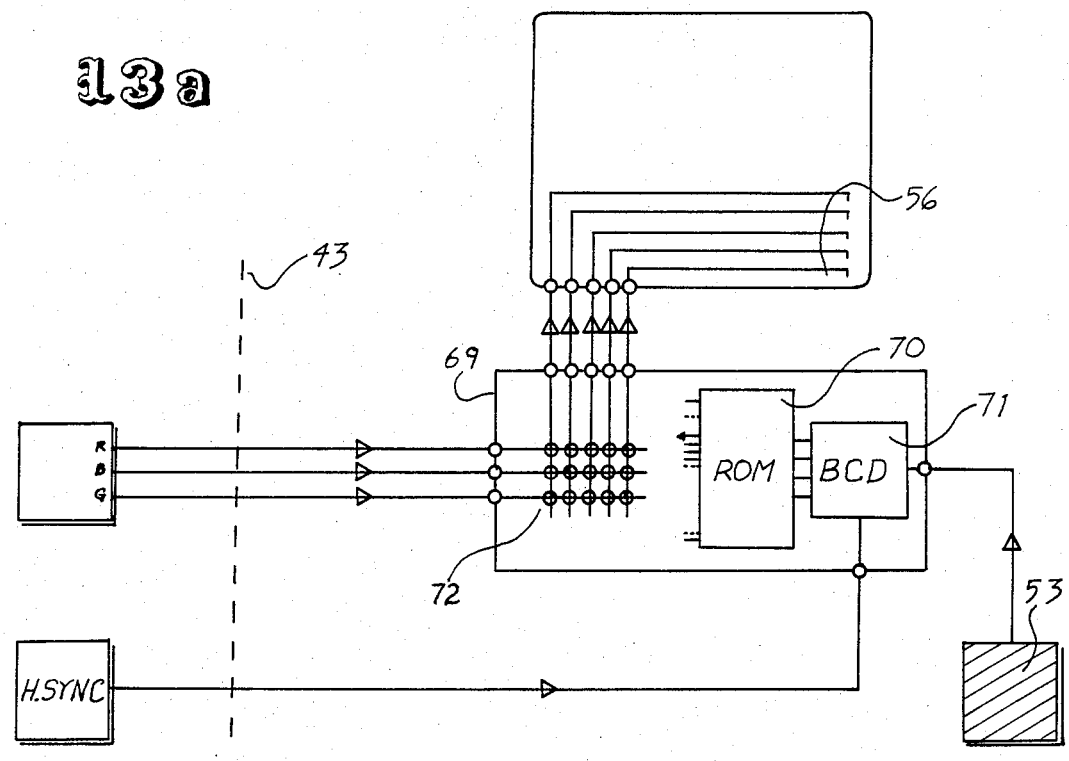
13a

FLATSCREEN

BACKGROUND OF THE DISCLOSURE

This invention relates to visual display panels for use in television receivers, monitors, computer readouts, and other video systems; or more specifically this invention is designed to replace the conventional cathode ray picture tube.

The efforts so far expanded to replace the cathode ray tube with a less complex and cumbersome panel are legion. In particular, a multitude of innovative displays have recently been disclosed based on light emitting diode, electroluminescent, laser, and gas discharge light emitting mechanisms.

The more prevalent cathodoluminescent light emitting mechanism, however, is often specified for display panels, as this continues to be a proven technique for video displays. In addition, the common "postdeflection acceleration" technique permits low voltage addressing of a cathode ray display, with brightness provided by a subsequent acceleration section, as contrasted with the typical gas discharge or electroluminescent display, for example, wherein the full picture element power must be controlled by the address circuitry.

This reasoning has led to many attempts at flat cathode ray panels, so far with less than ideal results. Two repeated failings of current proposals are burdensome addressing schemes, and manufacturing difficulties resulting from the complexity of these designs. The need to provide a simple addressing process and a low cost structure are fundamental to the achievement of a practical device for use by the general public.

As the most direct mode of addressing is by the well known "x-y matrix" a third problem that arises is the need to provide a large area electron source for the panel. Several sources have been proposed to meet this need, such as nets of thermionic emitters or various cold cathode devices; most of these add hinderances of cost or short useful lifetimes.

In recognition of these problems, a display panel is proposed based on the phenomenon of optical feedback as an electron source. Recent developments in photocathode and phosphor research have advanced this well known mechanism as a prime source of electrons for flat display devices, although current display proposals based on this effect have so far fallen far short of a practical device.

In the matter of addressing, the "self-shifting" or bussed cathode is without doubt the preeminent technique, offering greatly simplified panel construction, and vastly reduced external circuitry requirements. This process has, of late, been applied in several forms, such as attempts to produce shift registers using a photoconductive-electroluminescent active element (the name "lumistor" was suggested for this device), or more commonly in the so-called "self-scan" gas discharge display, and its many sub-variants. Because of switching speed problems and other limitations, however, this process has so far failed to achieve practical results in large display devices.

SUMMARY OF THE DISCLOSURE

Therefore, it is an object of the current invention to provide a cathode ray display panel combining, and more fully exploiting these two techniques, that of optical feedback, and the bussed cathode.

A further object of this invention is to provide such a panel with the utmost in simplicity and ease of manufacture.

A still further object of this invention is to provide a panel whose circuitry requirements are equal to or less than that found in contemporary video devices.

Another object of this invention is to provide a panel design lending itself readily to automated mass production.

Yet another object of this invention is to eliminate the external components frequently utilized in present-day picture tubes, such as ion traps, focusing magnets, deflection yokes, convergence coils, and the like.

These and other objects of the disclosure will be more fully understood in the following specification, in which two embodiments of the current invention are disclosed, as are three variations for a color display.

BRIEF DESCRIPTION OF THE DRAWINGS

FIGS. 3a–3c are a simplified representation of a shift register.

FIGS. 7 and 7a are a block diagram of the typical drive circuitry and scanning waveforms, respectively, for the panel.

FIGS. 8 and 8a are a simplified representation of the operation of the panel of the second embodiment.

FIG. 9 is a plan view of the substrate of the second embodiment.

FIG. 10 is a plan view of the separator of the second embodiment.

FIGS. 11 and 11a are a simplified representation of a variation of the embodiments to provide a color display from the panel.

FIGS. 12 and 12a are a simplified representation of a further color variation.

FIGS. 13 and 13a are a simplified representation of a third color variation.

DESCRIPTION OF THE PREFERRED EMBODIMENTS

Figure 1:
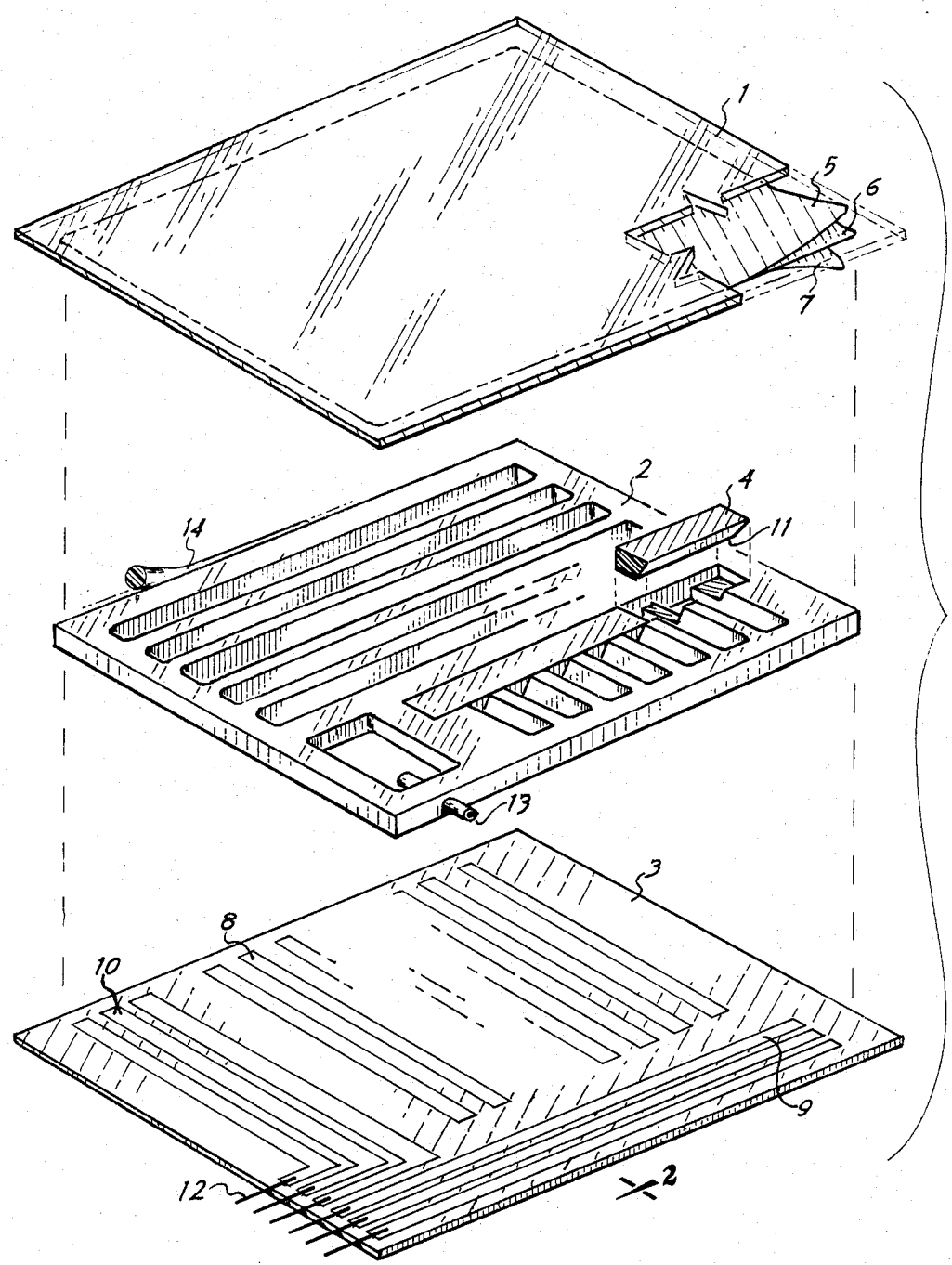
FIG. 1 is an exploded dimetric view of the panel.

In describing the preferred embodiments of the invention, specific terminology will be used for the sake of brevity and clarity; however, the ambit of the patent is not intended to be limited in quantity or extent to the terms so selected, each specific term including all technical equivalents which may operate in a similar manner to accomplish a similar purpose.

In the specification, the abbreviation "nm" will in all cases indicate nanometers, and "ns" will in all cases denote nanoseconds.

FIG. 1

In the first illustration, an exploded dimetric view, the panel will be seen to constitute essentially a front cover, designated by the number 1, a separator 2, and a substrate 3. Cover 1 and substrate 3 are of non-porous materials, assembled above and below separator 2 in a parallel apposition and encircled by seal 14 to complete an evacuated enclosure. Upon the inner surface of cover 1 is cathodoluminescent phosphor layer 5, conductive coating 6, and possibly phosphor layer 7; upon the inner surface of substate 3 is shown an arrangement of photocathodes 8 through 10. The embodiment further encompasses electrical interconnecting means 12, exhaust outlet 13, and possibly non-conductive support 4 with photocathode 11, secured transversely to separator 2 during assembly. Not shown in the drawing is a high voltage electrical connection means to coating 6. The panel construction may be simplified by forming an integral assembly from cover 1 and separator 2, although the preferred technique is to maintain these as separate assemblies, to assure a more uniform deposition of the cover 1 phosphors.

In operation, the substrate 3 photocathodes conjointly with inner phosphor 7 (hereinafter referred to as the scan phosphor) form opto-electronic shift registers, typically a horizontal register 9 and a vertical register 10. Photocathodes 8 form parallel address leads, the number of which is equivalent to the number of lines in the displayed information. Photocathode 11 is the video input, applied preferably to a support 4 as shown, or variously directly to substrate 3.

FIG. 2

The panel construction is further disclosed in this sectional view through the panel. In addition to the aforementioned components are separator barriers 15 forming channels 16 to guide optical signals from the vertical shift register 9, and optical port 17, optional cross-barriers 18, insulator 19, and screen grid 20. Ports 17 may be placed at various locations on barriers 15. The number of channels 16 in the embodiment will correspond to the number of picture lines orthogonal to the lines defined by leads 8.

FIG. 3a

Figure 3A:
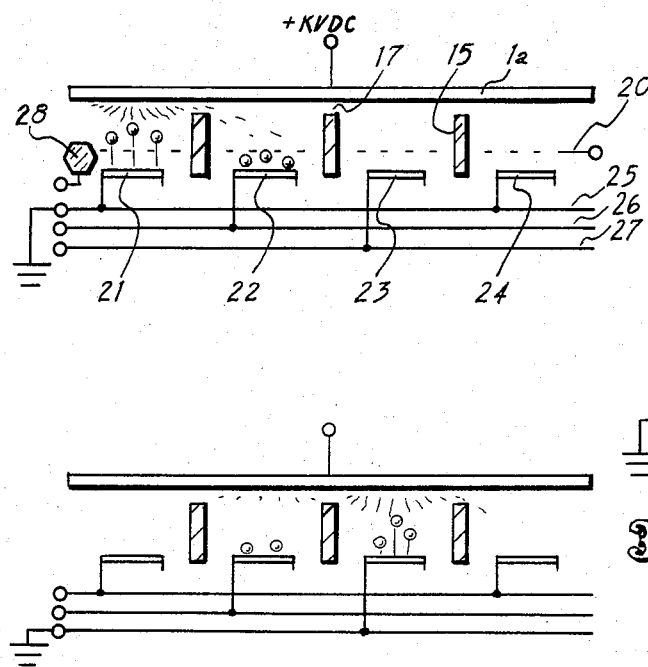
Figure 4:
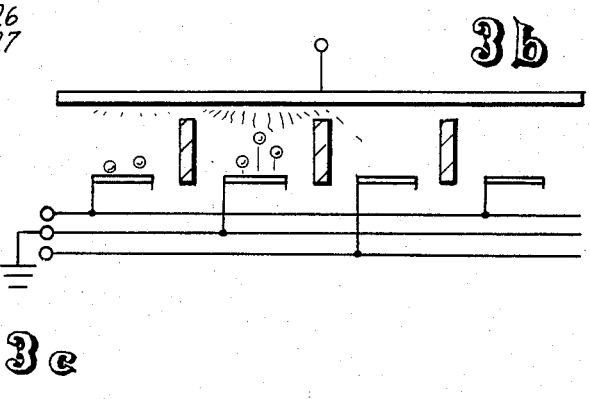
FIG. 4 is a simplified representation of the operation of the panel.
Figure 4:
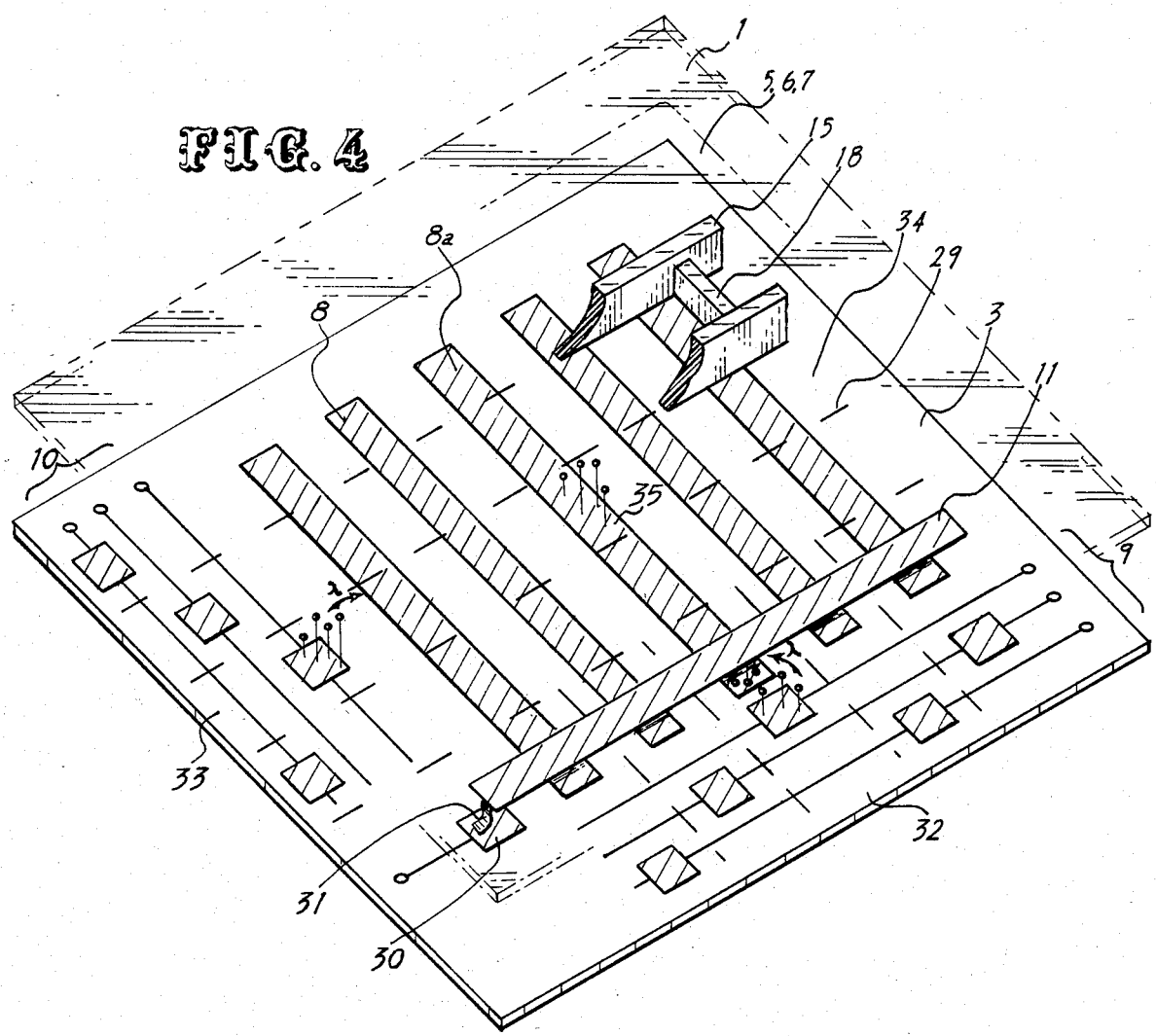

FIG. 3 is a simplified representation of a section of either shift register. Anode 1a represents a subassembly consisting of front cover 1, conductive film 6, and scan phosphor 7 of the preferred embodiment, with the area beneath partitioned into cells by separator barriers 15. Barriers 15 are opaque to light generated by the anode 1a phosphor except for leakage permitted by optical ports 17. Between barriers 15 are photocathodes 21, 22, 23 and 24, connected alternately to scan lines 25, 26 and 27. Interposed between photocathodes 21 through 24 and anode 1a may be one or more screen grids 20, maintained at a low DC voltage to shield the external driver circuitry from the high voltage of anode 1a.

To commence operation of the scanner, an initiating signal is provided by starter means 28. The initiating pulse is either a flash of light to liberate photoelectrons from photocathode 21 or exite the anode 1a phosphor to luminescence, or it may be a scintilla of electrons to produce light when drawn to and striking anode 1a or to produce electrons by secondary emission from photocathode 21. This momentary efflux will establish a self-sustaining current between photocathode 21 and anode 1a. Continued emission from photocathode 21 will be assured by the luminescence of anode 1a, this light flux resulting from impingement of photocurrent from cathode 21. Put more simply, the cell will "latch" once triggered by starter means 28, operation thence maintained by optical feedback. This optical feedback mechanism is described, for example, in U.S. Pat. Nos. 2,092,814 and 2,754,428, and in British Pat. No. 499,661, the two latter patents including intermediate electrode structures. The use of this configuration for a logic element is discussed, for example, in U.S. Pat. Nos. 3,086,120 and 3,406,288. For these elements to so function, the spectral output of anode 1a and the spectral response of photocathode 21 must of course correspond, and additionally a high enough accelerating potential must be present upon anode 1a to surmount the inefficiency of the mechanisms involved.

During this time no current is emitted from photocathode 22 as there is no complete circuit to this electrode. However, a small amount of light effusing thru a port 17 will illuminate photocathode 22, thus raising on electron "cloud" above 22, depicted in the representation as small circles.

FIG. 3b

The operation of the scanner continues when, as shown, lead 25 is disconnected and lead 26 is grounded. When lead 25 is opened, current in the first cell ceases immediately, despite the vestigial glow of the phosphor of anode 1a and the resultant electron cloud above cathode 21. However, the second cell, consisting of photocathode 22 and the next section of anode 1a is now forward biased, and current here begins to flow. Once triggered, cell two latches in the manner of the first as the phosphor above cell one extinguishes.

FIG. 3c

Scanning continues when, as shown, line 26 is disconnected and line 27 is grounded. Opening line 26 immediately suspends current flow in the second cell; and the third cell, consisting of the next section of anode 1a and photocathode 23, latches, triggered by the phosphor glow from the second cell.

At this point the principles of the scanner should be apparent. A strobing of lines 25 through 27 successively from top to bottom will result in a forward biased cathode continually arising to the right of the cathode previously actuated, thereby causing a "packet" of light to be stepped down the register at the scan line switching frequency. This scanning can be reversed by switching the lines in the inverse order causing the packet to progress right to left, or the packet can be held stationary at any cell. A long shift register of 500 or so cells can similarly be constructed by adding additional cells in the manner disclosed in FIG. 3.

FIG. 4

For the purpose of the shift registers, the reader is referred to the illustration, a simplified representation of the operation of the entire panel, with cover 1 and its associated coverings 5 through 7 shown in phantom line and raised from its usual placement, and separator 2, consisting of a regimen of barriers 15, their actual extent represented by broken lines 29, and optional cross-barriers 18. Upon substrate 3 are two shift registers 9 and 10, both of a type previously recounted, and horizontal address leads 8. Suspended above the ends of address leads 8 is video photocathode 11, connected to pad 30 by interconnect 31. To clarify the panel operation, the horizontal and vertical scanners 9 and 10 are shown stopped momentarily in mid-screen, the horizontal 9 at cell 32, and the vertical 10 at cell 33.

Beginning with horizontal cell 32, the glow from the phosphor of this cell, directed and confined by barriers 29 proceeds further into the cell, as denoted by the freehand arrow, illuminating the portion of cathode 11 above the cell. This results in a photocurrent from cathode 11 to horizontal address lead 8a immediately below, thereby completing a circuit from pad 30, held at or near ground, through interconnect 31 and photocathode 11. As a result, a forward bias arises between lead 8a and conductive coating 6 held at a high positive potential. The desired picture element 35 on line 8a is selected by an optical signal emanating from vertical cell 33, directed by barriers 29 through channel 34. Picture element 35 is triggered and latched in a manner analogous to the aforementioned shift register cells as the vertical address optical signal traverses address leads 8. Element 35 will remain latched until the connection to pad 30 is interrupted, or until scanner 9 is advanced to a contiguous cell, thus breaking the circuit from cathode 11 to lead 8a.

Having thus described the addressing of an individual picture element, it follows that any picture element on the screen can be addressed in a like manner, and furthermore that a recurrent scan or raster pattern can be obtained by applying appropriate scanning signals to shift registers 9 and 10, and ultimately that this raster can be modulated to create a luminous image from phosphor 5 by applying an appropriate synchronized signal to video cathode 11.

It should be noted that, in difference to prior art feedback displays, the present invention employs optical address signals to trigger the display, as contrasted to the use of thermionic emission, as this produces unreliable results in a video display, or the use of, say, energy storage means or plasma discharge means, as is called for in the prior art. As will be discussed later, no energy storage is permissible in this design as it may retrigger panel elements when not desired. Additionally, in contrast to the majority of matrix devices employing any light emitting mechanism, the current invention is characterized by an extremely simple structure, in keeping with the object of a mass producible device, and does not require the use of orthogonal, or crossed address lines, this prior configuration often requiring an incumbrant pattern of transparent conductors applied upon the device faceplate.

FIG. 1.

Figure 2:
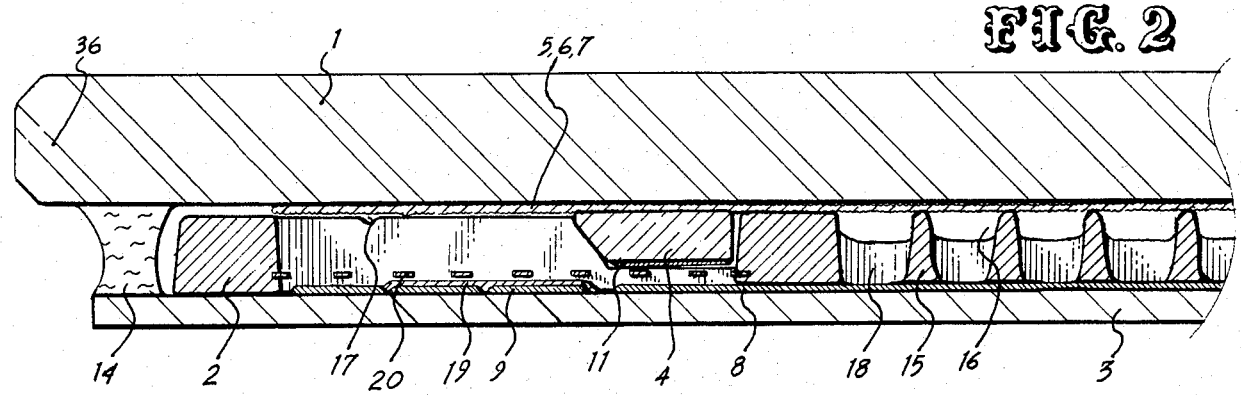
FIG. 2 is a partial section through the panel.

The panel construction will now be examined in detail, beginning with cover 1, this preferably a flat sheet of glass, whose composition, surface treatment, tinting and the like will not vary significantly from the existing art, the most notable dissimilarity being the lessened strength requirements as cover 1 is not a single unsupported span, this also lessening the need for implosion protection for the panel. Cover 1 may be provided with a lenticular external surface to render a brighter and more uniform image, as described, for example, in U.S. Pat. No. 2,760,119. It is preferred that cover 1 be slightly larger in length and width than the balance of the panel to furnish an overhang 36 (shown in FIG. 2) by which the completed panel may be supported.

Onto the inner surface of cover 1 is deposited a radiation emitting screen, this of several possible configurations. In all instances, at least one layer 5 is required, this to render a luminous presentation to the viewer. If no other is to be used, layer 5 must, in addition, produce radiation inward for photocathodes 8 through 10, with backing 6 transparent to radiation from layer 5.

If it is determined that this initial (or image) layer 5 is unsuitable for producing radiation internally for photoemission,, supplementary layer 7 is then required, deposited onto a reflective backing 6; this configuration similar to an image storage panel described in the proceedings of the IRE, vol 40, no 1, pg 12, January 1959.

A third configuration, an amalgamated layer of phosphors 5 and 7 with a subsequent transparent backing 6 may also be used, although if a two-phosphor screen is opted for a backing 6 as reflective as possible to both phosphors 5 and 7 is preferrably interposed between layers 5 and 7, so that backscattered light from image phosphor 5 is reflected outward and light from scan phosphor 7 reflected inward, thereby improving the efficiency of both layers and preventing interaction between phosphors 5 and 7.

The output spectrum, persistence, and other characteristics of the luminophor selected for image phosphor 5 will be dictated by the eventual use of the panel; for example, monochrome video devices such as monitors and home television receivers will preferably use a JEDEC type no P-4, or zinc sulfide and zinc cadmium sulfide.

Phosphor 5 is applied to cover 1 by any number of existing techniques, such as settling, rolling, spraying, (silk) screen printing, vacuum evaporation, centrifugal dispersion, or electrostatic deposition. All of these processes will profit from the fact that cover 1 is a flat sheet, as contrasted to the domed faceplate of the existing art. Of the techniques named, water settling or screen printing would be preferred, settling a proven process to produce high quality layers and screen printing selected for speed. The output of two to three screens per hour by water settling apparatus can be compared to the 1800 or so prints per hour on screen printing machines of the rotating carriage type, the organic vehicles used removed by heating or during outgassing of the panel. Large "wall screen" panel phosphors may be applied in sections by multiple screen printings, with careful registry held between successive screenings.

For highly detailed screens, such as the phosphor patterns used in color displays, either the common photolithographic deposition technique may be used, or again screen printing, or several techniques developed for flat displays, such as those described in the IEE (British) Proceedings, Vol 105B, no 24, pg 581, November 1958, or the IEEE Transac Electron Devices, vol ED-20, no 11, pg 1078, November 1973.

To improve image contrast, a final variation (not shown) is to apply opaque, non-reflective material upon the inner surface of cover 1 to darken the unused image phosphor 5 areas above the separator barriers 15, such as described in U.S. Pat. No. 3,247,412. If a color display is to be used, the opaque stripes (and resultantly the separator 2 apexes) may be located so as to infringe upon the blue phosphor stripes, a technique suggested, for example, in U.S. Pat. No. 4,220,892.

The next screen component, conductive coating 6, will preferably be a thin metal foil of, say, aluminum or beryllium, typically of 200 to 500 nm thickness (assuming an acceleration potential of between ten and fifty kilovolts), applied by the common technique of vacuum plating onto a previously laid-down laquer film. If a strong accelerating field is to be used, detachment of film 6 may result, a phenomenon encountered in a similar opto-electronic device, the common proximity focused image tube. In these tubes, special screen deposition techniques have been developed to allow accelerating fields considerably in excess of the approximately 40 kv/cm allowable by the more common deposition processes, as discussed, for example, in Advances in Electronics and Electron Physics, vol 28A, pg 129, 1969 (Academic Press). A further technique is to provide a relatively field-free region near cover 1 to reduce the electrostatic force upon coating 6 by positioning a second screen grid (not shown) in close proximity to cover 1. Alternately, the apexes of barriers 15 (shown in FIG. 2) may be coated with a conductive film (not shown), comparable to the "end-spoiling" process on microchannel plates, to shield coating 6 from the field in the panel.

To ensure optical isolation of phosphors 5 and 7 if, for example, leakage from scan phosphor 7 would interfere with image phosphor 5 causing color purity problems or if light leakage from image phosphor 5 or stray room light would cause false triggering of photocathodes 8, film 6 must then be free of any pinhole light leaks. To this end, further screen fabrication techniques may be borrowed from image tube manufacturing, such as the "float" process described in Advances in Electronics and Electron Physics, vol 22A, pg 571, 1966 (Academic Press). If a single phosphor 5 is to be used, film 6 must be transparent to radiation from phosphor 5, variously by reducing the thickness of the metal film, or using a clear conductive coating, such as one of tin oxide or indium oxide.

Lastly, cover 1 may or may not include scan phosphor 7, deposited onto the inner surface of film 6 by techniques set forth for phosphor 5. Phosphor 7 must be applied in such a manner that the incoming electron beam is distributed partially to layer 7 and not blocked from reaching phosphor 5. Actual choices of phosphors for layer 7 will be discussed in conjunction with the substrate 3 photocathodes.

A major factor influencing the selection of a suitable scan phosphor compound is the heavy loading of the shift register phosphors. For example, with a commercial TV format, the horizontal scanner phosphor will be used repeatedly for ever line in the raster, thus receiving about five hundred times the beam current of the screen phosphor, the vertical scanner phosphor being similarly called upon. This disparity can be greatly alleviated, however, by increasing the relative size of the scanner elements, thus distributing the beam current over a larger area. Additionally, the scanner drive signals may be modulated by the incoming video, such that the scanner light output is high only when required to address the panel; and, as halation is not a problem with the shift register phosphors, they may be applied to cover 1 with more intimate contact than conventional phosphors, thus reducing their operating temperature.

A final variation on the cover 1 screen is to apply a hyaline covering (not illustrated) over scan phosphor 7 to protect its fluorescent crystals from so-called $\mp$ion burn", although the deterioration experienced in conventional cathode ray tubes is substantially reduced in this panel as there is no single focused particle beam.

FIG. 5

What is shown is a plan view of substrate 3. Substrate 3 is preferably of glass, ceramic, or a glass-ceramic mixture, typicaly three to ten millimeters thick. Major preconditions for the substratum include surface smoothness, high surface resitivity, and chemical durability, 95.5% alumina preferred, possibly with a glass coating if a smoother finish is required. The selected material must be opaque to light from scan phosphor 7 to prevent light leaks to neighboring cells. Upon substrate 3 are deposited directly, or onto underlying metal conductors, photocathodes 8, 9 and 10 by say screen printing or vacuum plating. If photocathodes are used throughout, an insulating film 19 is overlayed by say screen printing to occlude photoemission except where desired, and if metal conductors are first applied, the photoemissive material is then deposited only where required. Metal conductors may be required if a high resistance photoemissive material is specified. A reflective backing under the photocathodes will permit the use of the so-called "double reflection" photosurface, as discused in the text 'Photoemissive Materials' by A. H. Sommer, (Krieger 1980), pg. 53.

Referring again to the illustration, shown is a lead 30 for electrical connection to video cathode 11 (FIG. 1), lead 37 for electrical connection to screen grid 20 (FIG. 2), electrical interconnecting means 12, two conductors 38, and two starter means 28.

As previously recounted, starter means 28 may be either a source of light or a source of electrons and, not shown in the illustration, a means consisting of a window or light pipe, such as shown in U.S. Pat. No. 3,229,306, to direct a pulse from an external light source to the interior of the panel. Starter means 28 should have build-up and decay characteristics that approximate those of the respective scan phosphor; in the case of light emitters, the spectral output should correspond to the spectral response of photocathodes 9 and 10 or the exitation curve of scan phosphor 7. Among known illuminants, an AC electroluminescent element (typically a zinc sulfide dielectric layer) applied by screen printing between conductor 38 and one of the scan lines 9 or 10 would be exemplary. Other applicable sources include a bare tungsten filament or a light emitting diode. The list of applicable electron sources is diverse, encompassing many new cold cathodes in addition to the common thoriated tungsten or lathanum hexaboride thermionic emitter. For a review of cold emitters, the reader is referred to Advances in Electronics and Electron Physics, suppl 4, pg 1, 1968 (Academic Press), some further choices including a tin oxide emitter (The Review of Scientific Instruments, vol 42, no 1, pg 114, January 1971), a molybdenum cone field emitter (J Applied Physics, vol 47, no 12, pg 5248, December 1976), or an opto-electronic cathode (Solid State Electronics, vol 11, pg 661, 1968).

To ensure reliable triggering of horizontal address leads 8, an auxiliary vertical shift register (not shown) may be placed upon substrate 3 opposite the first to illuminate the horizontal leads 8 from both ends of the separator channels 16.

As this invention is largely dependent upon the elemental optical feedback cell, cell characteristics, and actual photocathode-phosphor combinations will now be reviewed. It will be found that the prior art describes many feedback cell configurations, although these somewhat abstruce dissertations generally lack practical information. In addition to manifest characteristics and limitations, two factors are of importance in the quest for a practical video devide; specifically, the speed and stability of the cell. Cell stability is related primarily to the photocathode, and speed to the phosphor, given the sub-nanosecond response of the typical photoemitter. In regards to speed, it is not to be overlooked that many of the prior art devices, although appropriate for low frequency use, are inapplicable at video rates if dependent on background radiation to initiate the emission process. More recently, a low level illumination from a supplementary long persistence phosphor has been found sufficient to produce a switching rate of around 1.5 ns in a cell with an interposed multiplier, as demonstrated in the IEEE Transac Consumer Electronics, vol CE-24, no 3, pg 492, August 1978.

In the discussion, the choide of photocathode-phosphor materials will be divided into four groups by wavelength: the visible, the ultraviolet, far ultraviolet, and x-ray. The use of infrared devices is not recommended.

Beginning with the photocathode, the two main requisites for the photocathode material are high quantum efficiency, and immutability under pulsed operation. The stability of the material is essential as the pulsed current density of several ma/cm$^2$ exceeds that generally found for this type of emitter. The stability, fatigue, and manufacturing problems of the common visible light sensitive emitters, such as CsSb, are well known, and their use in a consumer device of this type would be extemporaneous. In addition, the cesium vapors present during maufacture and often during the life of the device may cause additional problems by interacting with other panel components.

It will be found, however, that as emitters responding to progressively shorter wavelengths of light are employed, a corresponding improvement in stability will result. This fact is explained on the basis that as emitters responding to shorter wavelengths have higher work functions, chemical stability improves as one moves further and further from the visible spectrum. When the point is reached where photoelectric thresholds fall below 200 nm, for example, emitters in this range will be found in all cases to be unaffected by elemental oxygen. Thus, the achievement of a practical device is very much dependent upon the degree to which the cell operation is extended into the ultraviolet. In addition to stability, other advantages are inherent in a UV configuration: (a) most of these emitters are not affected by visible light (so-called solar blind), thus measures needed to prevent false triggering by room light or leakage from image phosphor 5 may not be required, (b) these emitters have much lower thermionic emission (which may also cause false triggering), and (c) at short wavelengths most metals will photoemit, these preferred from the manufacturing standpoint. A drawback of this configuration is the focusing difficulties resulting from the increased velocity of photoelectrons ejected by short wavelength radiation.

It should be noted that two alternatives may be preferable to the use of a UV system. Although the spectral emission of phosphors is an invariable process, the spectral response of photoemitters may be displaced over a wide range by two common techniques; the enhancement of photoemission by providing a strong electrostatic field at the surface of the emitter, and by the inclusion of small amounts of absorbed gasses, such as hydrogen or oxygen. Either of these, or both in combination, may be sufficient to shift the response of a stable material from the far to the near UV, or near UV into the visible. A second technique, discussed recently in U.S. Pat. No. 3,313,971, is to sheathe an unstable photocathode with an overlay of a stable coating transparent to light and electrons, such as a thin film of gold. This configuration has received little subsequent attention, however, and its effectiveness is apparently open to question.

For photocathodes in the visible, an S-20 is often specified for higher current use, showing a stable emission of several ma/cm$^2$ in imaging devices, as discussed in Applied Optics, vol 12, no 1, pg 90, January 1973. Above average stabilities have also been reported for the S-11 Photocathode.

For UV emitters, the reader is referred to the RCA Review, vol 28, no 1, pg 75, March 1967, this volume recommending emitters such as the Cs$_2$Te and CsI photocathodes. Although these particular examples are both cesium compounds, it should be borne in mind that the use of cesium per se is not objectionable, if it is bound in a stable compound, the precept still holding true that stability will improve at short wavelengths. The long term stability of Cs$_2$Te in image tubes, for example, is reported to be excellent, and CsI is a compound stable in dry air.

For the far ultraviolet, the obvious choice will be the pure metals, with the noble metals, such as gold, platinum, or palladium being especially preeminent. A noble metal emitter would represent the ideal electron source for this type of display device, since they are easy to apply, and impervious to subsequent manufacturing operations and deteriorative processes during use. A metal photocathode is also responsive to residual gasses, often displaying significant enhancement of photosensitivity, although the long term stability of metal-residual gas emitters is often variable. In addition to the many comprehensive theoretical treatments on emission from metals in the literature, empirical discussions for many metal photocathodes may also be found, such as palladium (J Electrochem Society, vol 125, no 6, pg 950, June 1978), aluminum (the Review of Scientific Instruments, vol 36, no 1, pg 19, January 1965), Tantalum (J Applied Physics, vol 36, no 9, pg 2939, September 1965), and gold, silver (J Optical Society of America, vol 49, no 5, pg 471, May 1959).

For the x-ray region, photoelectric yields in excess of fifty percent have been reported for many emitters in this range. Preferred among these would be Lithium fluoride and magnesium fluoride, as discussed, for example, in Applied Optics, vol 12, no 2, pg 388, February 1973.

In addition to conventional photosurfaces, two recently developed experimental emitters are also potentially applicable. The first is the so-called "photo-field" emitter described, for example, in Applied Physics Letters, vol 21, pg 384, October 1972, and in the J Applied Physics, vol 42, no 10, pg 3762, September 1971. Although typified by unusually high quantum efficiencies, their practical utilization is currently limited by maufacturing and noise problems. The second is the magnesium oxide cold cathode, as described in the IEE (British) Proceedings, vol 108B, no 37, pg 103, January 1961. For its use in video devices, the switching speed limitations of this emitter would first have to be overcome. The emission of electrons from the MgO cathode is a complex process, apparently a combination of field, internal and external secondary, and photo emission. In this application, optical feedback from the cover 1 phosphors would be used to trigger and maintain the required surface charge, with additional current provided by the other mechanisms. The MgO layer is applied preferably upon nickel conductors, or upon cobalt, as described in the IEEE Proceedings, vol 51, no 1, pg 484, March 1963. The photosensitivity of the MgO cathode is discussed in U.S. Pat. No. 2,802,127; and its use in a display device is discussed in U.S. Pat. No. 3,258,629.

Turning now to the phosphor, as previously mentioned, the phosphor must have build-up and decay times that permit operation at video frequencies. The decay time is also limited by the switching rate of the address shift registers, with the persistence not exceeding a certain maximum value, as excessive afterglow may retrigger shift register cells out of sequence. The maximum allowable persistence may be determined approximately by the following relationship:

$$T_p = 1/f(N_L - 1)$$

where f is the switching rate, $N_L$ the number of scan lines (ie three in FIG. 3), one over f the dwell time or period, and $N_L$ minus one as the phosphor will not decay until the second period; the first period used to build up the phosphor light output. This estimate of decay time is based on the afterglow dropping to one or two percent of full output, not the 10% or 1/e figures commonly quoted; also this limitation applies only to a maximum decay, as there is no minimum requirement; a phosphor with no decay time whatsoever usable by overlapping the scan line pulses to allow the light packet to be transferred to an adjoining cell.

As the panel may employ more than one shift register, and these may operate at dissimilar rates, the faster register, typically the horizontal 9, will prevail in setting the decay, although an alternative (not illustrated) is to provide two scan phosphors, one over each of the registers 9 and 10; either of these, or variously a third phosphor, used for the remainder of the screen.

It will be seen from the formula that, for video frequencies, the horizontal scanner phosphor should have a decay below a microsecond, and preferably in the 10 ns to 200 ns range. The need for such fast phosphors is also present in the common flying spot scanner CRT, and in register stripes for the so-called "beam index" color CRT, and light emitters developed for these devices will be found to be applicable to the current invention. Coincidently, most of these phosphors employ the metal cerium as an activator, as this invariably leads to a fast phosphor, although many cerium phosphors have exibited less than ideal longevity. For high speed operation, fast decays in the $10^{-8}$ to $10^{-10}$ second region are avaliable in the form of so-called "edge emission" phosphors. The decay of the UV edge emission band of P-15, for example, was recently set at only 1.04 ns, and 3.4 ns to complete cessation of luminance. Unusually brief decays in the $10^{-10}$ second range have been reported for several new edge emission phosphors, such as those disclosed in U.S. Pat. Nos. 3,534,210 and 3,534,211. These luminophors should, in theory, allow operating frequencies, and correspondingly incoming video rates, in excess of 100 mhz for the panel. This is in sharp contrast to the switching speed limitations so far inherent in lumistor or gas discharge shift registers.

As for actual scan phosphor 7 choices, some visible emitters include P-46 or $Y-Ce_3Al_5O_{12}$ (with a peak of emission at 550 nm and a persistence of 120 ns), P-47 or $Y-Ce_2SiO_5$ (415 nm, 30 ns), $SrGa_2S_4$:CeNa (455 nm, 80 ns, J Electrochem Society, vol 119, no 12, pg 1720, December 1972), or YOCl:Ce (400 nm, 25 ns, J Electrochem Society, vol 117, no 3, pg 346, March 1970) as examples from technical literature. Some new phosphors developed from the beam index CRT are described in the IEEE Transac on Consumer Electronics, vol CE-27, no 3, pg 43, August 1981. This reference also describes an improved phosphor adhesion process.

Applicable ultraviolet phosphors include P-16 or $Ca_2MgSi_2O_7$:Ce (383 nm, 120 ns), $YPO_4$:Ce (340 nm, 25 ns, Phillips Technical Review, vol 32, no 5, pg 125, 1971), or $SrZnSi_2O_7$:Pb (320 nm, 100 ns, IEEE Transac Electron Devices, vol ED-18, no 9, pg 713, September 1971), to cover published literature summarily. Several additional choices are those described in U.S. Pat. No. 3,104,226.

In the matter of far UV phosphors, however, an exigous supply of emitters will be found. This is particularly noteworthy in that this range of wavelengths is where the stable metals are most responsive, and this and other feedback devices would benefit from a wide choice of far ultraviolet cathodoluminescent compounds. Phosphors that are available include $ZrP_2O_7$ (285 nm, 2,000 ns, Phillips Research Reports, vol 7, pg 401, 1952), $BaMgAl_{16}O_{27}$:Tl (1%) (295 nm, 200 ns, Phillips Research Reports, vol 29, pg 517, 1974), $BaZrSi_3O_9$ (285 nm, no decay given, J Solid State Chemistry, vol 2, no 1, pg 105, June 1970), or $Ba_2Zr_2Si_3O_{12}$ (285 nm, no decay given, J Electrochem Society, vol 119, no 9, pg 1237, September 1972). Additionally, in a recent research report on radar CRT screens is disclosed several far UV emitters, including $Al_2O_3$:Al and $Be_2SiO_4$:Be (pgs 129-130, PB#25481, Lib of Congress), although details are lacking. To this paucity of emitters can be added three new phosphor disclosures, an improved $ZrP_2O_7$ (297 nm, no decay given, U.S. Pat. No. 3,941,715), a new $HfP_2O_7$ (266 nm, no decay given, U.S. Pat. No. 4,014,813), and $LiYF_4$:Pr (220 nm, no decay given, U.S. Pat. No. 4,070,598.

For an x-ray feedback cell, scan phosphor 7 would be removed, and a metal target layer, such as aluminum, would be used for coating 6 to provide both the accelerating potential for the panel, and x-ray feedback for the substrate photocathodes. Although a simplified, and therefore a seemingly preferred configuration, this combination will be found to have some limitations. For the separator 2 barriers 15 to contain the x-rays emitted, rays in the "soft" region must be used; however, the efficiency of soft x-ray generation is usually very low. In addition, simple surfaces will not reflect even a fraction of impinging x-rays, and thus only the rays emitted downward will produce photoelectrons. Finally, at low accelerating voltages, the x-rays generated are radiated more or less at 90° to the incoming electron beam, and are thus lost to the cell walls. This is advantageous for the optical address signals, as they will be directed laterally to adjoining cells, but individual feedback cells will be adversely affected by this limitation. The use of lead oxides or similar heavy metal oxides in the separator 2 walls will increase the opacity to hard x-rays, but an upper limit of wavelengths will be set by limitations of known glass and ceramic compositions.

FIG. 6

In this plan view is shown separator 2. Separator 2 consists of subulate vertical barriers 15 to define the vertical shift register and paths for the address optical signals, optional cross-barriers 18, horizontal barriers 39 to demarcate the horizontal shift register, screen grid 20, set-ins 40 into barriers 39 to secure support 4 (shown in FIG. 1), and additional set-ins 41 to position support 4. Also shown are optical ports 17, these being gaps, light pipes, or other means to transfer light thru the separator 2 walls. A small compartment 42 may be located in an unused area to hold a flash getter and an exhaust tube 13.

Separator 2 is fabricated from an opaque, non-conductive material, such as glass, ceramic, or a glass-ceramic, as will be support 4 if used. Separator may be (and preferably will be) a porous structure to facilitate evacuation of the panel. Desirable characteristics of the material include low dielectric loss at scan frequencies, electrical breakdown strength, and minimal predisposition to luminesce under cathode ray or photon excitation to prevent false triggering of the substrate photocathodes 8 through 10. The cathodoluminescent properties of some typical glasses may be found in Applied Optics, Vol 14, no 9, pg 2104, September 1975. To ensure triggering of the picture elements most removed from the address registers, the optical channels formed by barriers 15 must be efficient light "pipes", with the separator 2 walls as reflective as possible to the address optical signals. Transmission of optical signals will be aided by the acute angle of the address beam to the barrier 15 walls.

Screen grid 20 will typically be a thin, perforated metal sheet, or possibly an array of woven or parallel wires. An additional technique, discussed in U.S. Pat. No. 4,137,477, is to mold grid 20 from a synthetic resin, such as polyimide, and subsequently fire the assembly to form a glassy carbon material.

In addition to providing optical barriers 15 for the substrate 3 photocathodes, separator 2 will, by virtue of its thickness, set the inter-panel gap between cover 1 and substrate 3. This gap spacing will vary, depending on panel size, accelerating voltage, and other criteria, imposing maximum and minimum allowable limits on the separator 2 thickness. A maximum limit is set primarily by the need to provide a strong accelerating field for proximity focusing, and the rapid falloff of the feedback cell efficiency as the gap widens. A minimum limit is set by the inability of the panel to withstand a strong field, and the increased possibility of false triggering by field emission or field-enhanced thermionic emission at strong fields.

Describing these limitations in more detail, a mathematical solution by nomograph for the problem of proximity focusing based on incident light wavelength, applied voltage, gap, and picture element size may be found in Applied Optics, vol 16, no 8, pg 2127, August 1977 For the typical panel design this maximum spacing will be seen to vary from between 5 mm to 30 mm or so depending upon the photocathode-phosphor combination chosen. The focusing characteristics will also be affected by the ability of the separator 2 barriers 15 to confine the electron current. The limitation of cell efficiency is a result of the falloff of feedback light as the spacing between the photocathode and anode increases; in an unconfined cell this falloff roughly following the inverse square law for light intensity. This effect can be reduced by improving the reflectivity of the cell walls, although disproportionate aspect ratios of size to length of the cells may result in an excessive accelerating voltage.

For minimum spacings, the most important limitation is a failure of the insulators at strong fields. Although an arc across the vacuum gap or through the bulk of the separator 2 is possible, such a failure will invariably occur first as a surface flashover. For a simple molded structure this failure can be expected at intensities of about 20 kv/cm. This performance, however, can be improved by flashover-resistant configuration set forth in the literature, such as described in the J Vacuum Science and Technology, vol 2, no 4, pg 234, July 1965, and in the IEEE Transac Electrical Insulation, vol El-7, no 1, pg 9, March 1972, these allowing fields in excess of 60 kv/cm. To prevent static charges from forming on the separator barriers 15, a high resistance, conductive glass may be used, or alternately separator 2 may be coated with a film of say chrome oxide or calcium fluoride, such as detailed, for example, in U.S. Pat. No. 3,577,027. The coatings described will have the further benefit of reducing fluorescence of barriers 15. Any coatings applied should be as reflective as possible to facilitate optical addressing.

The second limitation, false triggering at high fields, will set an approximate limit of about 50 kv/cm before excessive currents will flow. This may be improved by careful deposition of the substrate 3 photocathode films, and a subsequent "clean-up" operation by running the panel at an abnormally high voltage to burn off any field emitting protrusions. An annealing operation has also been found helpful on certain materials. If one or more screen grids 20 are to be used, field emission from these electrodes must be similarly limited. Unwanted thermionic or photo emission from grids 20 may be suppressed by fabrication from an emission inhibiting material, such as titanium or zirconium, or the use of a suppressing coating, such as described in U.S. Pat. No. 3,327,152.

In addition, two other factors influencing the separator thickness are the increased difficulty in manfacturing the separator 2 barriers 15 as they become larger and narrower, and the possible detachment of coating 6 as previously discussed.

Separator 2 may be fabricated in a single molding operation by say injection molding, dry or isistatic pressing, slip casting, or wet pressing a glass or ceramic powder with a suitable organic binder, expelling the green perform from the mold, and sintering at an elevated temperature. A second method is to fabricate separator 2 in a laminated manner from thin sheets of glass or ceramic produced by rolling or doctor-blade extrusion, and perforated by photochemical milling, punching, or machining, with the sheets fired before or after assembly. Additionally, fabrication may be by assembling separate vane-like structures, as demonstrated in a display panel described in the IEEE Transac Consumer Electronics, vol CE-24, no 3, pg 500, August 1978, or in a honeycomb manner, such as described in Chemical and Engineering News, vol 36, no 31, pg 42, Aug. 4, 1958. A further technique is by an extrusion process, wherein a multi-nozzle device, moving across the upper surface of substrate 3, dispenses parallel ribbons of a putty-like glass powder mixture to form barriers 15, with a subsequent heating operation to fuse the ribbons into a rigid contexture.

A last and preferred technique is to manufacture the separator 2 conjointly with substrate 3 (or alternately cover 1) in the following manner: substrate 3 is first plated with the desired photoemissive material, the plating done thru a mask to produce the required pattern, a suitable process of this type being that described in the IBM J of Research and Development, vol 22, pg 601, November 1978. Substrate 3 may be coated with a protective film at this point to protect it from subsequent operations. Separator 2 is then produced by screen printing successive layers of ink onto substrate 3, this ink consisting say of a low temperature devitrifying glass powder with a suitable organic binder, along with other additives to create an ink with the necessary thixotropic properties. The successive printing operations are done with dissimilar screens with narrowing lines to taper the barrier walls. The finished screen grid 20 is inserted into the lamina at the appropriate level. After printing, the assembly is fired to devitrify or harden the separator barriers. This is done typically by heating for an hour at about 450° C. and then slowly cooling the assembly. This or an additional heating operation is used to remove the protective film from substrate 3, or variously the film may be removed during the outgassing procedure. A final step, if required, would be to machine the upper surface of separator 2 to ensure a flat seal against cover 1.

FIG. 7

What is here shown in a block diagram of the basic drive circuitry for the panel. The reader will note the circuitry enclosed by broken line 43 as typical for a monochrome television receiver.

The output 44 of the video amplifier is directed to the panel video cathode 11, and may be direct coupled, as is the common practice. The output 45 of the vertical sync is applied to pulse shaper 46 and then to vertical starter means 28. This vertical or "flyback" pulse initiates the scan of the vertical shift register 10 to begin each frame. The output 47 of the horizontal sync is directed to pulse shaper 48 and then to horizontal starter means 28 to trigger horizontal shift register 9 at the beginning of each line. Output 48 is also directed to three step counter 49 to provide sequential pulses to vertical scan lines 10 at the horizontal line rate (typically about 15 khz), thus causing vertical shift register 10 to advance once for each horizontal line.

Pulse shapers 46 and 48 are used, if required, to modify the video sync pulses to the requirements of the chosen starter means 28. Additionally, shapers 46 and 48 may be required to adjust the width of the sync pulses, as an overly long pulse may produce additional, unwanted packets in the first scanner cell each time it is forward biased.

It will be noted that an interlaced raster will not be produced inherently by the panel; however, it may be produced by a non-symmetrical vertical scan, described below and further detailed, for example, in the IEEE Transac Electron Devices, vol ED-20, no 11, pgs 1092 and 1098, November 1973. In this system, counter 49 provides alternate long and short pulses, long pulses to address the desired lines, and short pulses to pass over unwanted lines. This is shown in FIG. 7a, where graph A, illustrating scanning of the panel if interlacing is not used, consists of a series of long, isochronal pulses labeled numerically 1, 2, 3 and so on. The numbers correspond to the raster lines, while the pulse width represents the duration of the address in elapsed time, graph A therefore showing each line addressed for equal intervals. In graph B, however, only the odd-numbered horizontal lines are addressed for long intervals, the even lines receiving only a pulse long enough to transfer the light packet, this transfer occurring ideally during the horizontal blanking interval, and are thus skipped over. In graph C, the format is reversed. If, then, an alternating scan is directed to the vertical shift register in the sequence B, C, B, C etc., an interlaced raster will result, with correct interweaving assured by odd-even detector 50 providing a control signal 51 to counter 49.

The horizontal shift register 9 is driven by three step counter 52, operating at the incoming picture element rate (typically several megahertz), driven by pulse generator 53. Generator 53 may be either free-running, its speed set by frequency (or picture width) control 54 as shown, or variously by a comparator circuit from the horizontal sync 47.

Conductive film 6 is connected to the desired accelerating potential; screen grid 20 to a fixed, low control voltage. The ultor voltage supply filtering, normally provided for by the double coated walls of CRT's, may be effectuated here by the inherent capacitance of the panel, or by an external filter capacitor of several thousand picofarads. The external scan circuitry should be protected from a sudden failure of the screen grid 20 potential, this protection (not shown) taking the form of spark gaps, fuses, varistors, or other such devices located at the panel interconnecting means 12. This protection may variously be integral with the panel, applied upon substrate 2.

A final possible addition to the external circuitry is in regards to image uniformity. Nonuniformities occur in flat display devices because of the multitude of separate display cells and address circuits. It has been found that careful manufacturing will all but eliminate panel defects, with driver circuitry irregularities the more pervasive difficulty. This problem is virtually non-existent with the current invention because of its simplified external circuitry, although uniformity may be assured by techniques suggested for the prior art, an ultor-feedback regulator described in U.S. Pat. No. 4,077,054 being exemplary.

FIG. 8

In this figure is shown a simplified representation of a second embodiment of the invention, this version not employing horizontal scanner 9 and its associated components. This variation more notably parallels the operation of the self-scan display referred to earlier, and basic knowledge of this device by the reader is assumed in this description.

In this variation, horizontal address leads 8 are connected alternately to three or more horizontal scan lines 56. Interjacent to vertical scanner 10 and the first horizontal scan lead 8b is a transfer photocathode 55. The cross-barriers 18 are required in this version. In all remaining respects, the panel construction and operation are unchanged from the first embodiment.

The scanning begins with a light packet established in the first cell of scanner 10 by starter means 28. To initiate a horizontal scan, transfer photocathode is grounded briefly, generating a separate packet in the transfer photocathode cell adjoining the first scanner 10 cell. This packet will then generate a third packet, this in the first cell of the first lead 8b. The current path to transfer photocathode 55 is then opened, extinguishing the packet in its first cell. At this point the address voltage to scanner 10 may be lowered to reduce loading of the scanner 10 phosphor. To advance the newly formed packet across leads 8, horizontal scan lines 56 are sequentially grounded, causing the packet to shift across in the manner of the aforementioned shift registers, thus completing a line scan. Subsequently, vertical scanner 10 is advanced to the next line, the scanner 10 packet triggering a new packet in the second cell of lead 8b by a brief energising of transfer cathode 55, and the second display line is scanned. This process is repeated to produce the complete raster. A non-symmetrical vertical scan may be used as before to produce an interlaced raster.

Vertical scanner 10 must be collateral to the side of the display at which the line address begins (typically the left), unlike the first embodiment, in which scanner 10 may be located on either or both sides. Additionally, as scanner 10 is now required only to trigger the adjoining cathode 55, the phosphor loading problem will not occur in this embodiment.

Transfer photocathode 55, comparable to the reset cathode of the self-scan display, is used to isolate vertical scanner 10, for otherwise each grounding of lead 8b by the external scan circuitry would produce a new packet on this line. It will be seen that cathode 55 may be eliminated by providing sufficient optical isolation between scanner 10 and lead 8b, and momentarily increasing the luminous output of scanner 10 to initiate a horizontal scan. It is preferred, however, that cathode 55 be retained to ensure more reliable operation of the panel.

In this embodiment, the video signal will modulate either screen grid 20 or the drive signals to the horizontal scan lines 56, and preferably the latter. Unlike the first embodiment, however, the video signal cannot drop to the zero level, as the horizontal scan packet must be maintained at a discrete minimum level for it to be transferred by each horizontal lead 8 in turn. As this will accordingly reduce the video image contrast, the minimum transfer level should be as imperceptable as possible. This dilemma is avoided in the self-scan display by its tri-planar construction, the scan function occuring on the rear anodes, and transferred to the front image anodes only as required. A somewhat congeneric tri-planar configuration is possible with the current panel design; although if the maximum range of image contrast is obligatory, the impasse is more simply resolved by the bi-planar configuration of the first embodiment. In most instances, however, it is presumed that the impairment of contrast will not be objectionable. This contrast loss is also encountered in the beam index color CRT, and images displayed on these tubes, such as one shown by photograph in Popular Science, vol 200, no 2, pg 64, February 1972, have been found to be of acceptable quality.

FIG. 8a

Shown here is a block diagram of the basic drive circuitry of the second embodiment, this basically consonant with that of FIG. 7. The output of pulse shaper 48 is now applied to transfer cathode 55. Pulse shaper 48 must delay the control signal to cathode 55 until counter 49 has completed the transfer of the scanner 10 packet to the next scanner cell. The other variation is the video driver 57, this modulating the horizontal scan pulses from counter 52. The minimum video transfer level of driver 57 is set by level control 58.

FIG. 9

Figure 5:
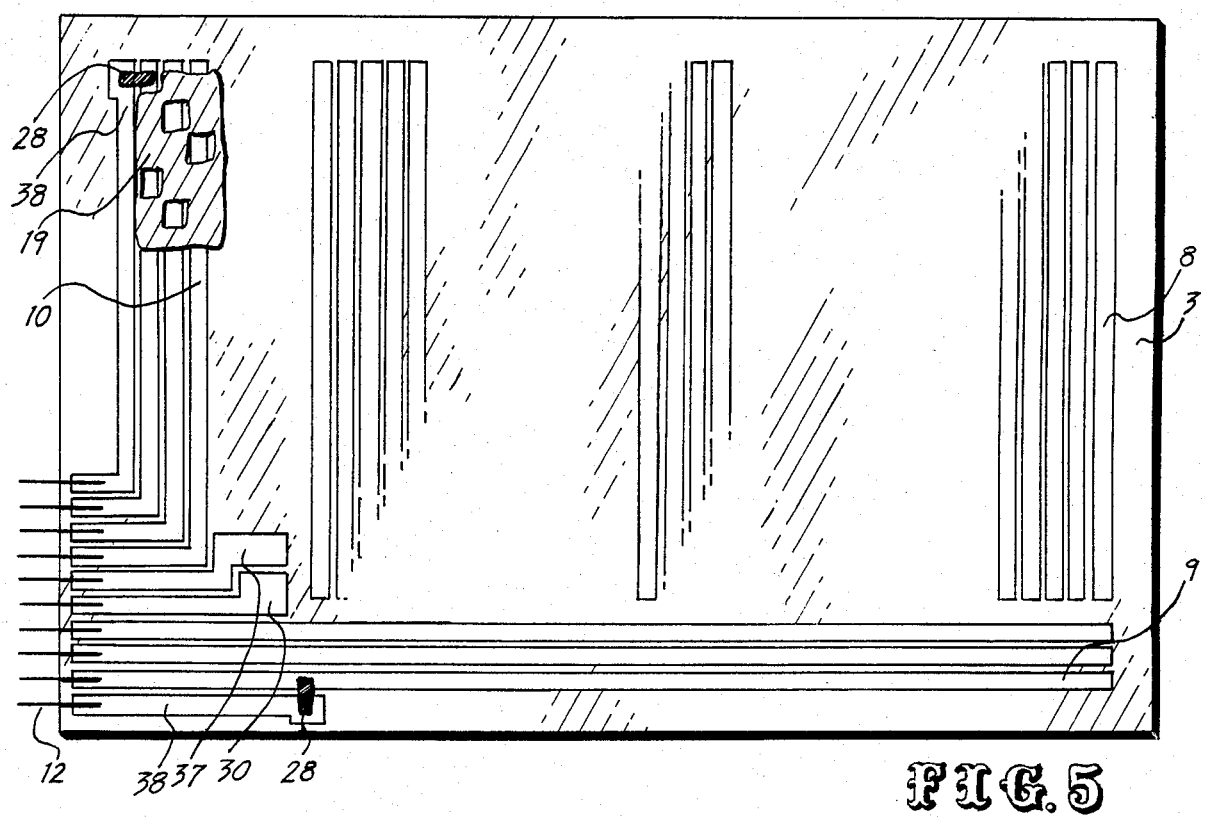
FIG. 5 is a plan view of the substrate of the first embodiment.

What is here shown is a plan view of the substrate 3 of the second embodiment. In addition to components described in FIG. 5 are the following: transfer photocathode 55, horizontal scan lines 56, and insulating cross-over bridges 59. In the actual manufacturing process, bridges 59 may be combined with film 19, if used, or applied separately. Also shown is an alternative configuration for starter means 28, this applicable for either embodiment. In this variation, a starter means 28b is connected between any two of the three or more address lines 10, and actuated by addressing both lines simultaneously.

FIG. 10

Figure 6:
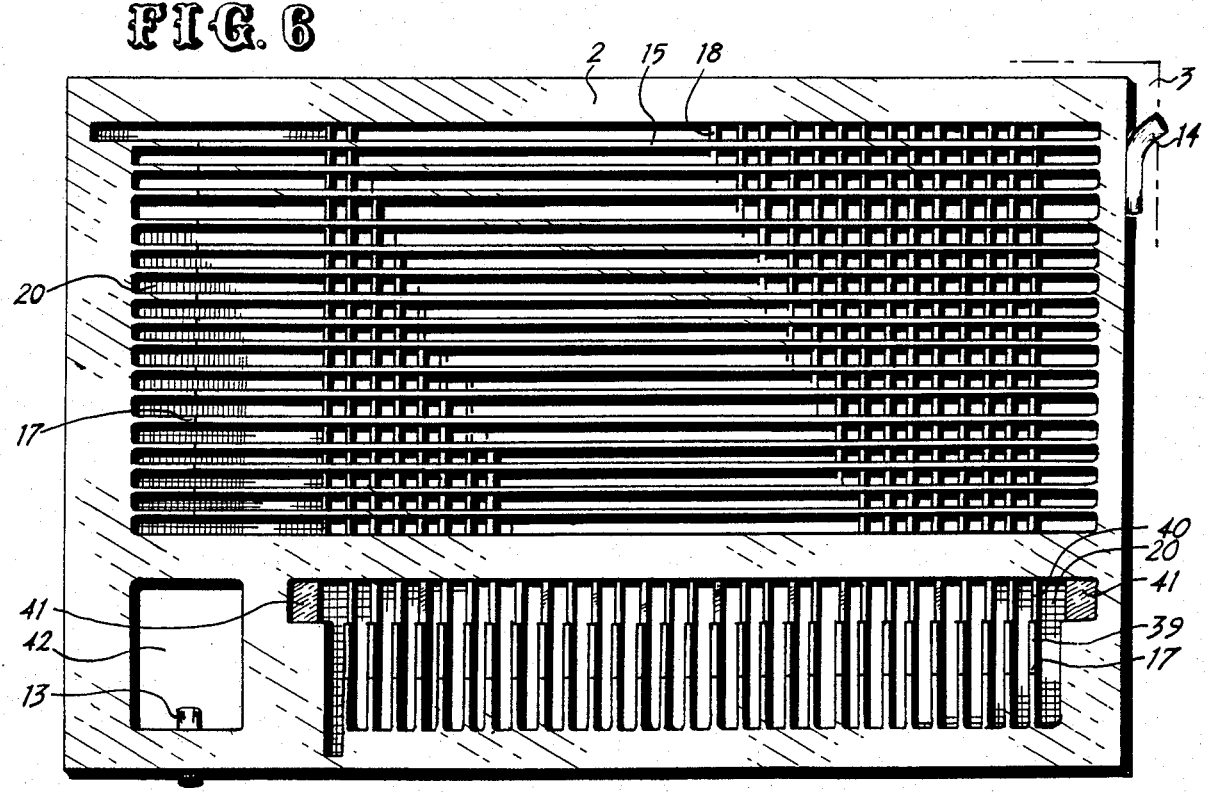
FIG. 6 is a plan view of the separator of the first embodiment.

Shown here is a plan view of the separator 2 of the second embodiment. Unlike that described in FIG. 6, the separator 2 requires the use of crossbarriers 18, these defining three types of cells: vertical scan cells 60, transfer cells 61, and picture element cells 62. Screen grid 20 (if used), covers the entire panel, as contrasted with FIG. 6, wherein grid 20 is used only in the horizontal and vertical scanners.

A last variation on the previous embodiments would be an electron multiplier array interposed between, say, the substrate 3 and separator 2, or separator 2 and cover 1, or some other similar juxtaposition. The use of such a structure is in considerable favor in the prior art, as the effect of a high gain multiplier is to considerably amplify the electron beam current. It is preferred, however, that the use of such a non-uniform and complex array be avoided in the current invention, in favor of a simple, efficiently designed feedback cell.

FIG. 11

Figure 12:
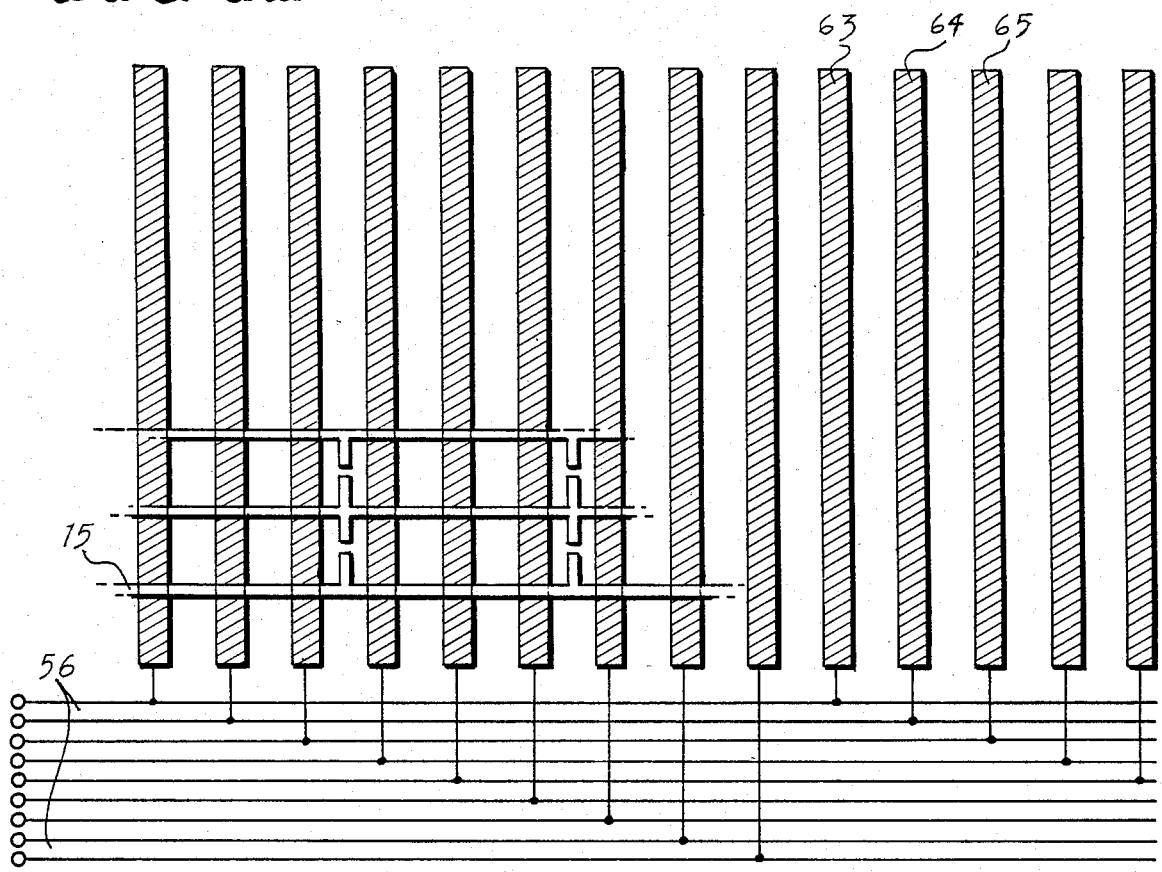
Figure 12:
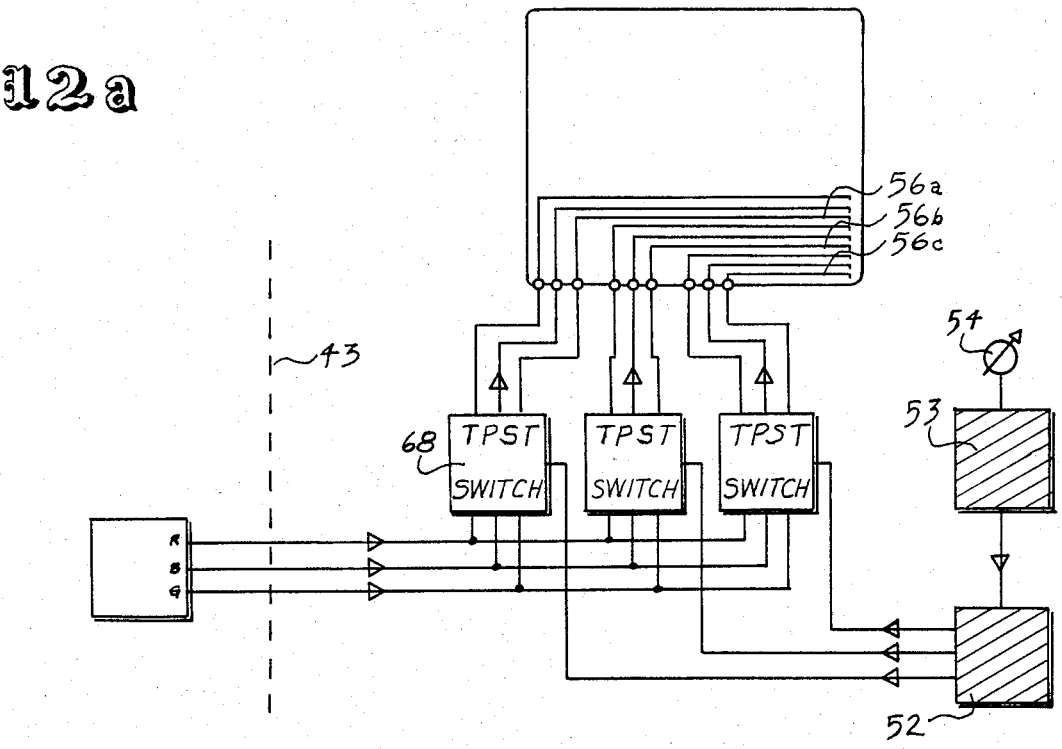

FIGS. 11, 12, and 13 illustrate three variations, applicable to either of the previous embodiments, these to produce a full color image from the panel. For the sake of brevity, the variations are shown as applicable to the second embodiment. Changes in the variations will permit the use of the NTSC, PAL, or SECAM formats. In the variations, the panel is preferably not operated in the matrix mode, but rather is driven by fully demodulated chroma drive signals. Although applicable to improve color purity, a shadow mask is not preferred; if used, it is preferably made of a non-magnetic material. Color synthesis in the variations is by the well known additive method, whereby the various tints are realized by combinations of the outputs from three primary phosphors. The addressing of these phosphors may be effectuated by two basic techniques; individual and simultaneous color addressing, hereinafter referred to more simply as "ICA" and "SCA". ICA is described in FIG. 11, SCA in FIG. 12, and a variation of SCA in FIG. 13.

Referring to FIG. 11, the horizontal address leads 8a of the embodiments are now divided into three separate leads; red leads 63, blue leads 64, and green leads 65. These are aligned under phosphor stripes (not shown) replacing the single image phosphor 5 on cover 1, as described, for example, in U.S. Pat. No. 1,934,821, a stripe of red emitting phosphor above each red lead 63, a blue phosphor above leads 64, and a green phosphor above leads 65. The phosphors used may be any in current use for direct view color television, such as a JEDEC type number P-22, this being blue zinc sulfide, green zinc cadmium sulfide, and red yttrium oxysulfide. Leads 63 thru 65 are connected alternately to three or more horizontal address lines 56 as shown, or aligned under three or more video cathodes applied to support 4 (not shown) if the first embodiment is used. Cross-barriers 18 are required between each address lead, as shown.

Referring now to FIG. 11a, what is shown is a block diagram of the ICA color circuitry. This circuitry is comparable to that shown in FIG. 9 with the exception of the three color drive or chroma signals from receiver 43 replacing the original monochrome luminance output. These three chroma signals are sampled alternately by three step counter 66, the selected signal directed to driver 57. In operation, generator 53 and counter 52 function as before, generator 53, however, now operating at three times the incoming picture element rate. The output of 53 also clocks counter 66, thus assigning one of the three chroma signals to each of the address lines 56 as they themselves are selected by counter 52. It will be seen that if three lines 56 are chosen, counter 52 may be used additionally to select the chroma signals, and counter 66 may be deleted. If more than three lines 56 are used, then separate counters are required. Color sync for 66 and 57 may be maintained by a reset pulse 47 from the horizontal sync. In summary, it will be seen that this system directs chroma information to the display by individually addressing chroma leads 63 thru 65, with only one color stripe of one picture element addressed at any given time, an addressing scheme comparable to the beam index CRT.

FIG. 12

In this illustration is shown SCA, with the prior chroma leads 63 through 65 now connected alternately to nine or more (twelve, fifteen, etc.) address lines 56.

The drive circuitry for SCA is shown in 12a. Generator 53 and counter 52 operate as before, generator 53 at the incoming picture element rate. The receiver 43 chroma drive signals are directed to three triple pole-single throw switching circuits 68. These are enabled sequentially by the output of counter 52. In operation, the counter 52 signals will select and direct the receiver 43 chroma drive signals in turn to the first three address lines 56a, the second three 56b, the third three 56c and then the first three 56a, to begin again. It will be seen that this variation will address the three phosphors of each picture element simultaneously, as is the case with the common three gun shadow mask color CRT.

FIG. 13

In this final illustration is shown a thrid variation, referred to as overlap color address, or "OCA". In this arrangement, the chroma address leads 63 through 65 are connected to four, or preferably five address lines 56. The addressing scheme is similar to SCA, with three leads activated at a given time, except that in this variation the addressing will shift one lead at a time. In operation, the addressing begins with the first three address lines 56 (from the top) activated, thus energising leads 63a, 64a, and 65a. Subsequently, the top line 56 is disconnected, and the fourth line 56 activated, shifting the address to leads 64a, 65a, and 63b. This sequence continues, next 65a, 63b, 64b, then 63b, 64b, 65b, and so on across the panel. If five lines 56 are used, three leads may be activated at a time, and if only four lines 56 are used, then two leads at a time may be addressed.

The external circuitry for OCA, shown in FIG. 13a, is more complex than the previous variations, and will typically be in the form of an "integrated circuit" package 69, this consisting say of a small ROM 70, a BCD counter 71, and a driver transistor matrix 72. In operation, pulse generator 53 will step counter 71 at three times the incoming picture element rate. Counter 71 will then address ROM 70, and the output of ROM 70 will then drive transistor matrix 72, assigning the receiver 43 chroma drive signals to the panel lines 56 in the correct sequence. Color sync may again be assured by a reset pulse from the receiver 43 horizontal sync.

The advantages of ICA are a simpler panel design and less complex external circuitry, and the advantages of SCA are improved duty cycle and a slower clock.

What is claimed and desired to be secured by Letters Patent of the United States is:

1. A video display device comprising an evacuated panel including, successively, a transparent cover, a cathodoluminescent screen producing radiation inward and outward, a non-conductive separator, and a non-conductive substrate with photoemissive elements disposed onto the inner surface thereof, an electron flow being produced between said screen and said elements by optical feedback, means for producing a DC potential between said screen and said elements to accelerate the electrons in said flow, further comprising;

means to modulate, from an external video signal, said DC potential to generate an image upon said screen, and:

said photoemissive elements arrayed so as to form:
   (a) parallel address leads of one axis of an x-y matrix;
   (b) active elements of an integral shift register to address the complimentary axis of said matrix, said active elements connected alternately to three or more scan lines actuated externally be a sequential control means, and divided into cells by said separator, with transfer means in said separator to transfer light between adjoining cells, so that a light packet produced by a starter means at one end of said register will be advanced along said cells as said scan lines are actuated, thereby producing optical address signals to said x-y matrix, said signals directed thru channels in said separator orthogonal to said address leads;
   (c) active elements of an additional integral shift register to address said parallel leads, said additional register optically coupling said parallel leads with an input means consisting of a support, and a photocathode upon said support aligned so as to be in proximity to said additional register and said parallel leads.

2. A display device, in accordance with claim 1, and further characterized by an additional integral shift register positioned on the opposite end of said complimentary axis to provide optical address signals from both ends of said separator.

3. A display device, in accordance with claim 1, and further characterized by a visual input means whereby said external video signal is applied to said photocathode upon said support.

4. A color display device, in accordance with claim 1, and further characterized by each of said substrate address leads divided into three leads, said leads underlying an additive, three color phosphor radiation emitting screen upon the inner surface of said front cover, and in which said photocathode upon said support is divided into an array of three or more chrominance input photocathodes aligned by said support means over said divided address leads, said input photocathodes controlled by an external chrominance signal.

5. A video display device comprising an evacuated panel including, successively, a transparent cover, a cathodoluminescent screen producing radiation inward and outward, a non-conductive separator, and a non-conductive substrate with photoemissive elements disposed onto the inner surface thereof, an electron flow being produced between said screen and said elements by optical feedback, means for producing a DC potential between said screen and said elements to accelerate the electrons in said flow, further comprising;

means to modulate, from an external video signal, said DC potential to generate an image upon said screen, and;

said photoemissive elements arrayed so as to form:
(a) parallel address leads of one axis of an x-y matrix, connected alternately to three or more interconnecting lines placed upon said substrate, said lines actuated by an external sequential control means;
(b) active elements of an integral shift register to address the complimentary axis of said matrix, said register consisting of said active elements connected alternately to three or more scan lines actuated externally by a sequential control means, said active elements divided into cells by said separator, with transfer means in said separator to tranfer light between adjoining cells, so that a light packet produced by a starter means at one end of said register will be advanced along said cells as said scan lines are actuated, said packet further advancing across said parallel address leads to address said complimentary axis thru channels in said separator as said interconnecting lines are actuated, said packet directed thru channels in said separator orthogonal to said address leads.

6. A display device, in accordance with claim 5, and further characterized by a transfer photocathode element and corresponding cells in said separator interposed between said shift register and said address leads to transfer said packet therethrough when actuated by an external control signal.

7. A color display device, in accordance with claim 5, and further characterized by each of said substrate address leads divided into three leads, said leads underlying an additive, three color phosphor radiation emitting screen upon the inner surface of said front cover, and in which said interconnecting lines are controlled by an external chrominance signal.

* * * * *